US008693607B1

(12) United States Patent
Schober

(10) Patent No.: US 8,693,607 B1
(45) Date of Patent: Apr. 8, 2014

(54) SELF-TIMED TIMER

(76) Inventor: Richard L. Schober, Cupertino, CA (US)

( * ) Notice: Subject to any disclaimer, the term of this patent is extended or adjusted under 35 U.S.C. 154(b) by 124 days.

(21) Appl. No.: 13/371,762

(22) Filed: Feb. 13, 2012

(51) Int. Cl.
*H04L 25/38* (2006.01)

(52) U.S. Cl.
USPC ............................ 375/370; 370/304; 370/298

(58) Field of Classification Search
USPC .......................................................... 375/340
See application file for complete search history.

(56) References Cited

U.S. PATENT DOCUMENTS

| | | | | |
|---|---|---|---|---|
| 4,593,282 A * | 6/1986 | Acampora et al. | 370/447 |
| 4,813,044 A * | 3/1989 | Kumar et al. | 714/809 |
| 5,455,930 A * | 10/1995 | Larson | 713/502 |
| 5,539,306 A * | 7/1996 | Riggio, Jr. | 324/754.03 |
| 7,015,856 B1 * | 3/2006 | Johnson | 342/32 |
| 7,071,751 B1 * | 7/2006 | Kaviani | 327/263 |
| 7,190,756 B1 * | 3/2007 | Kaviani et al. | 377/44 |
| 2002/0075827 A1 * | 6/2002 | Balogh et al. | 370/331 |

OTHER PUBLICATIONS

Schober, Richard L..;"Asynchronous State Machine Design Handbook"; Nov. 1, 2011; © 2011 Richard L. Schober.

Tinder, Richard F., "Asynchronous Sequential Machine Design and Analysis: A Comprehensive Development of the Design and Analysis of Clock-Independent State Machines and Systems", Morgan & Claypool Publishers, 2009.

Muller, D.E., et al.;"A Theory of Asynchronous Circuits," Proceedings of an International Symposium on the Theory of Switching, Part 1, pp. 204-243, Harvard University Press, Apr. 1959.

Knight, John; "Glitches and Hazards in Digital Circuits", Electronics Department, Carleton University, Mar. 24, 2004.

* cited by examiner

*Primary Examiner* — Chieh M Fan
*Assistant Examiner* — Santiago Garcia
(74) *Attorney, Agent, or Firm* — Fernandez & Associates, LLP

(57) ABSTRACT

The present invention discloses a digital self-timed timer for measuring the passage of time; a digital self-timed pulse generator for generating both continuous and finite pulse sequences; and a digital self-timed data receiver for recovering data from an asynchronous, two-wire bit-channel. Being self-timed, a disclosed self-timed timer measures time as a function of logic delays incurred while executing a sequence of internal state transitions. A pulse generator supports both a triggered pulse mode and continuous clock generation; pulse widths and pulse intervals are programmable. A data receiver may recover a data bit from each received two-bit code word and outputs recovered data and an associated write strobe for each recovered datum.

18 Claims, 33 Drawing Sheets

FIG. 2
(PRIOR ART)
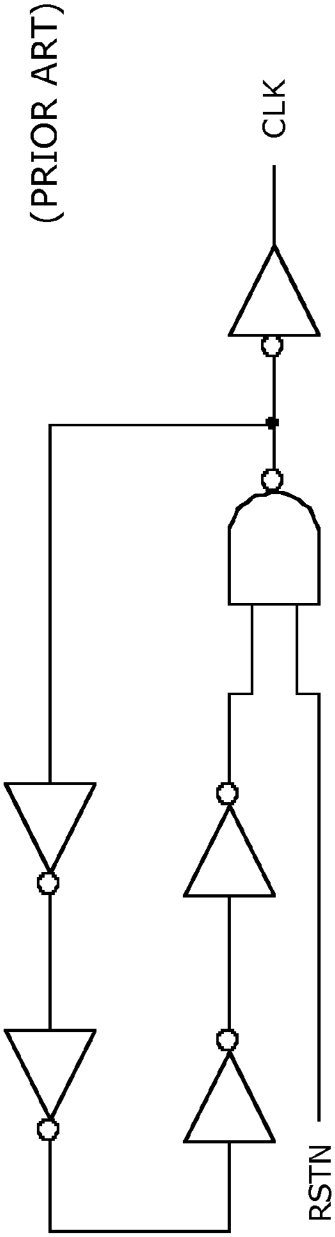
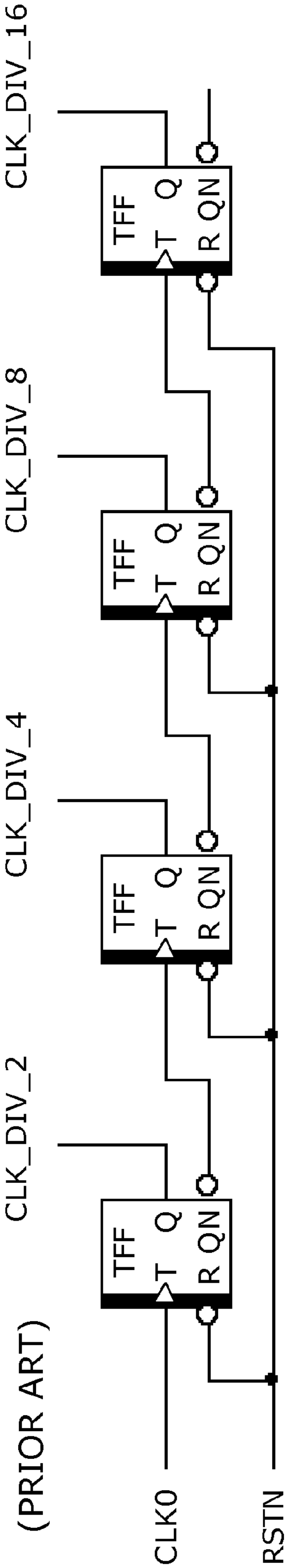
FIG. 3
(PRIOR ART)

| INPUTS | | | BASIC SR LATCH OUTPUTS | | COMMENTS | | ENHANCED SR LATCH OUTPUTS | |
|---|---|---|---|---|---|---|---|---|
| CLRN | S | R | Q | QN | | | Q | QN |
| 0 | X | X | 0 | 1 | RESET | | 0 | 1 |
| 1 | 0 | 0 | Q | QN | HOLD | | Q | QN |
| | 0 | 1 | 0 | 1 | RESET | | 0 | 1 |
| | 1 | 0 | 1 | 0 | SET | | 1 | 0 |
| | 1 | 1 | 0 | 0 | UNDEF. | HOLD | Q | QN |

FIG. 6

FIG. 9

PULSE TIMER STATE TABLE

| MODE SELECT INPUTS | | | | MODE | CURRENT COUNT VALUE (CNT 518) | COUNTER ACTION | OUTPUTS | |
|---|---|---|---|---|---|---|---|---|
| 507 RSTN | 501 LOAD0 | 502 LOAD1 | 503 COUNT | | | | 504 LOAD_DONE | 505 CNT_EQ_ZERO |
| 0 | X | X | X | 510 RESET | DON'T CARE | CNT = 0; | 0 | — |
| 1 | 0 | 0 | 0 | 511 IDLE | DON'T CARE | NONE | 0 | — |
| | 1 | 0 | 0 | 512 LOAD0 | CNT[i] != VALUE0[i] 508 | CNT[i] = ~CNT[i]; | 0 | — |
| | | | | | CNT == VALUE0 508 | NONE | 1 | — |
| | 0 | 1 | 0 | 513 LOAD1 | CNT[i] != VALUE1[i] 509 | CNT[i] = ~CNT[i]; | 0 | — |
| | | | | | CNT == VALUE1 509 | NONE | 1 | — |
| | 0 | 0 | 1 | 514 COUNT | CNT != 0 | CNT = CNT - 1; | 0 | 0 |
| | | | | | CNT == 0 | NONE | 0 | 1 |
| | OTHER | | | 515 UNSPEC. | DON'T CARE | UNSPECIFIED | — | — |

FIG. 13A

NON-WRAPPING GRAY CODE DECREMENT
SET-RESET LOGIC TRUTH TABLE
(PART 1 OF 2)

| | INPUTS | OUTPUTS | | A - 1 = A ⊕ (S \| R) |
|---|---|---|---|---|
| | A | S | R | |
| | 4 3 2 1 0 | 4 3 2 1 0 | 4 3 2 1 0 | 4 3 2 1 0 |
| MAX → | 1 0 0 0 0 | 0 0 0 0 1 | 0 0 0 0 0 | 1 0 0 0 1 |
| | 1 0 0 0 1 | 0 0 0 1 0 | 0 0 0 0 0 | 1 0 0 1 1 |
| | 1 0 0 1 1 | 0 0 0 0 0 | 0 0 0 0 1 | 1 0 0 1 0 |
| | 1 0 0 1 0 | 0 0 1 0 0 | 0 0 0 0 0 | 1 0 1 1 0 |
| ↓ DECREASING MAGNITUDE ↓ | 1 0 1 1 0 | 0 0 0 0 1 | 0 0 0 0 0 | 1 0 1 1 1 |
| | 1 0 1 1 1 | 0 0 0 0 0 | 0 0 0 1 0 | 1 0 1 0 1 |
| | 1 0 1 0 1 | 0 0 0 0 0 | 0 0 0 0 1 | 1 0 1 0 0 |
| | 1 0 1 0 0 | 0 1 0 0 0 | 0 0 0 0 0 | 1 1 1 0 0 |
| | 1 1 1 0 0 | 0 0 0 0 1 | 0 0 0 0 0 | 1 1 1 0 1 |
| | 1 1 1 0 1 | 0 0 0 1 0 | 0 0 0 0 0 | 1 1 1 1 1 |
| | 1 1 1 1 1 | 0 0 0 0 0 | 0 0 0 0 1 | 1 1 1 1 0 |
| | 1 1 1 1 0 | 0 0 0 0 0 | 0 0 1 0 0 | 1 1 0 1 0 |
| | 1 1 0 1 0 | 0 0 0 0 1 | 0 0 0 0 0 | 1 1 0 1 1 |
| | 1 1 0 1 1 | 0 0 0 0 0 | 0 0 0 1 0 | 1 1 0 0 1 |
| | 1 1 0 0 1 | 0 0 0 0 0 | 0 0 0 0 1 | 1 1 0 0 0 |
| | 1 1 0 0 0 | 0 0 0 0 0 | 1 0 0 0 0 | 0 1 0 0 0 |

FIG. 13B

NON-WRAPPING GRAY CODE DECREMENT
SET-RESET LOGIC TRUTH TABLE
(PART 2 OF 2)

| INPUTS | OUTPUTS | | A - 1 = A ⊕ (S \| R) |
|---|---|---|---|
| A | S | R | |
| 4 3 2 1 0 | 4 3 2 1 0 | 4 3 2 1 0 | 4 3 2 1 0 |
| 0 1 0 0 0 | 0 0 0 0 1 | 0 0 0 0 0 | 0 1 0 0 1 |
| 0 1 0 0 1 | 0 0 0 1 0 | 0 0 0 0 0 | 0 1 0 1 1 |
| 0 1 0 1 1 | 0 0 0 0 0 | 0 0 0 0 1 | 0 1 0 1 0 |
| 0 1 0 1 0 | 0 0 1 0 0 | 0 0 0 0 0 | 0 1 1 1 0 |
| 0 1 1 1 0 | 0 0 0 0 1 | 0 0 0 0 0 | 0 1 1 1 1 |
| 0 1 1 1 1 | 0 0 0 0 0 | 0 0 0 1 0 | 0 1 1 0 1 |
| 0 1 1 0 1 | 0 0 0 0 0 | 0 0 0 0 1 | 0 1 1 0 0 |
| 0 1 1 0 0 | 0 0 0 0 0 | 0 1 0 0 0 | 0 0 1 0 0 |
| 0 0 1 0 0 | 0 0 0 0 1 | 0 0 0 0 0 | 0 0 1 0 1 |
| 0 0 1 0 1 | 0 0 0 1 0 | 0 0 0 0 0 | 0 0 1 1 1 |
| 0 0 1 1 1 | 0 0 0 0 0 | 0 0 0 0 1 | 0 0 1 1 0 |
| 0 0 1 1 0 | 0 0 0 0 0 | 0 0 1 0 0 | 0 0 0 1 0 |
| 0 0 0 1 0 | 0 0 0 0 1 | 0 0 0 0 0 | 0 0 0 1 1 |
| 0 0 0 1 1 | 0 0 0 0 0 | 0 0 0 1 0 | 0 0 0 0 1 |
| 0 0 0 0 1 | 0 0 0 0 0 | 0 0 0 0 1 | 0 0 0 0 0 |
| **0 0 0 0 0** | **0 0 0 0 0** | **0 0 0 0 0** | **0 0 0 0 0** |

↓ DECREASING MAGNITUDE ↓

FIG. 14

```
S[4]  =  1'b0 ;
R[4]  =  A[4] & A[3] & ~( A[2] | A[1] | A[0] ) ;

S[3]  =   A[4] & ~A[3] & A[2] & ~( A[1] | A[0] ) ;
R[3]  =  ~A[4] &  A[3] & A[2] & ~( A[1] | A[0] ) ;

S[2]  =   ( A[4] ⊕ A[3] ) & ~A[2] & A[1] & ~A[0] ;
R[2]  =  ~( A[4] ⊕ A[3] ) &  A[2] & A[1] & ~A[0] ;

S[1]  =   ( A[4] ⊕ A[3] ⊕ A[2] ) & ~A[1] & A[0] ;
R[1]  =  ~( A[4] ⊕ A[3] ⊕ A[2] ) &  A[1] & A[0] ;

S[0]  =   ( A[4] ⊕ A[3] ⊕ A[2] ⊕ A[1] ) & ~A[0] ;
R[0]  =  ~( A[4] ⊕ A[3] ⊕ A[2] ⊕ A[1] ) &  A[0] ;
```

FIG. 15

For $n \geq 6$, where n is the number of bits in operand A and results S and R:

$$S[n-1] = 1'b0 ;$$

$$R[n-1] = A[n-1] \,\&\, A[n-2] \,\&\, \sim( A[n-3] \mid \ldots \mid A[0] ) ;$$

$$S[n-2] = A[n-1] \,\&\, \sim A[n-2] \,\&\, A[n-3] \,\&\, \sim( A[n-4] \mid \ldots \mid A[0] ) ;$$

$$R[n-2] = \sim A[n-1] \,\&\, A[n-2] \,\&\, A[n-3] \,\&\, \sim( A[n-4] \mid \ldots \mid A[0] ) ;$$

$$S[i] = ( A[n-1] \oplus \ldots \oplus A[i+1] ) \,\&\, \sim A[i] \,\&\, A[i-1] \,\&\, \sim( A[i-2] \mid \ldots \mid A[0] ) ; \text{ for } n-2 > i > 2;$$

$$R[i] = \sim( A[n-1] \oplus \ldots \oplus A[i+1] ) \,\&\, A[i] \,\&\, A[i-1] \,\&\, \sim( A[i-2] \mid \ldots \mid A[0] ) ; \text{ for } n-2 > i > 2;$$

$$S[2] = ( A[n-1] \oplus \ldots \oplus A[3] ) \,\&\, \sim A[2] \,\&\, A[1] \,\&\, \sim A[0] ;$$

$$R[2] = \sim( A[n-1] \oplus \ldots \oplus A[3] ) \,\&\, A[2] \,\&\, A[1] \,\&\, \sim A[0] ;$$

$$S[1] = ( A[n-1] \oplus \ldots \oplus A[2] ) \,\&\, \sim A[1] \,\&\, A[0] ;$$

$$R[1] = \sim( A[n-1] \oplus \ldots \oplus A[2] ) \,\&\, A[1] \,\&\, A[0] ;$$

$$S[0] = ( A[n-1] \oplus \ldots \oplus A[1] ) \,\&\, \sim A[0] ;$$

$$R[0] = \sim( A[n-1] \oplus \ldots \oplus A[1] ) \,\&\, A[0] ;$$

FIG. 21

| PULSE SEQUENCER STATE TABLE | | | | | | | | | | |
|---|---|---|---|---|---|---|---|---|---|---|
| CURRENT STATE | | OUTPUTS | | | | | EXIT CONDITION | NEXT STATE | |
| NAME | VALUE | 701 LOAD0 | 702 LOAD1 | 703 COUNT | 708 ACTIVE | 709 PULSE | | NAME | VALUE |
| 720 LOAD0 | 0 0 0 | 1 | 0 | 0 | 0 | 0 | 706 ENABLE & 704 LOAD_DONE | 721 T00 | 0 0 1 |
| 721 T00 | 0 0 1 | 0 | 0 | 0 | 1 | 0 | ALWAYS TRUE | 722 CNT0 | 0 1 1 |
| 722 CNT0 | 0 1 1 | 0 | 0 | 1 | 1 | 0 | 705 CNT_EQ_ZERO | 723 T01 | 0 1 0 |
| 723 T01 | 0 1 0 | 0 | 0 | 0 | 1 | 0 | ALWAYS TRUE | 724 LOAD1 | 1 1 0 |
| 724 LOAD1 | 1 1 0 | 0 | 1 | 0 | 1 | 0 | 704 LOAD_DONE | 725 T11 | 1 1 1 |
| 725 T11 | 1 1 1 | 0 | 0 | 0 | 1 | 0 | ALWAYS TRUE | 726 CNT1 | 1 0 1 |
| 726 CNT1 | 1 0 1 | 0 | 0 | 1 | 0 | 1 | 705 CNT_EQ_ZERO | 727 T10 | 1 0 0 |
| 727 T10 | 1 0 0 | 0 | 0 | 0 | 0 | 0 | ALWAYS TRUE | 720 LOAD0 | 0 0 0 |

| TWO-WIRE BIT-CHANNEL CODING | | | | | | |
|---|---|---|---|---|---|---|
| 860 CODE WORD (CW) [1:0] | PARITY | 865 DATA (D) | | | | |
| | | 861 A | 862 B | 863 C | 864 D | |
| 0 0 | 0 | 0 | 0 | 1 | 1 | |
| 0 1 | 1 | 0 | 1 | 1 | 0 | |
| 1 1 | 0 | 1 | 1 | 0 | 0 | |
| 1 0 | 1 | 1 | 0 | 0 | 1 | |

861 OPTION A: DATA = CODE_WORD[1];
862 OPTION B: DATA = CODE_WORD[0];
863 OPTION C: DATA = ~CODE_WORD[1];
864 OPTION D: DATA = ~CODE_WORD[0];

FIG. 29

| DATA DETECTOR STATE TABLE | | | | | | |
|---|---|---|---|---|---|---|
| CURRENT STATE | | OUTPUTS | | EXIT CONDITION | NEXT STATE | |
| NAME | VALUE | 903 WR_DATA | 905 WR_ENBL | | NAME | VALUE |
| 920 WAIT ODD | 0 0 | 901 RX_DATA_A | 0 | 911 RX_DATA_ PARITY_EQ_ODD | 921 STORE ODD | 0 1 |
| 921 STORE ODD | 0 1 | | 1 | 904 WR_ACK | 922 WAIT EVEN | 1 1 |
| 922 WAIT EVEN | 1 1 | | 0 | 910 RX_DATA_ PARITY_EQ_EVEN | 923 STORE EVEN | 1 0 |
| 923 STORE EVEN | 1 0 | | 1 | 904 WR_ACK | 920 WAIT ODD | 0 0 |

SELF-TIMED TIMER

CROSS-REFERENCE TO RELATED PUBLICATIONS

Information providing background and explanation to the instant invention is found in the following publications. U.S. Pat. No. 7,071,751, Kaviani; U.S. Pat. No. 7,190,756, Kaviani et al.; U.S. Pat. No. 7,477,112, Pi et al. Additional references include: Richard L. Schober, "Asynchronous State Machine Design Handbook", November 2011; Richard F. Tinder, "Asynchronous Sequential Machine Design and Analysis: A Comprehensive Development of the Design and Analysis of Clock-Independent State Machines and Systems", Morgan & Claypool Publishers, 2009. The following lecture notes, include information on the nature and treatment of glitches in digital logic: John Knight, "Glitches and Hazards in Digital Circuits", Electronics Department, Carleton University, Mar. 24, 2004; www.doe.carleton.ca/~jknight/97.267/267_04W/Asch1HazShorapdf [Jul. 22, 2011]. The referenced patents, articles and notes are incorporated herein in their entirety by reference.

BACKGROUND OF THE INVENTION

1. Field of the Invention

The present invention is in the field of asynchronous state machines, also known as self-timed state machines, wherein an external clock is disallowed.

2. Description of Related Art

Nearly all digital systems built today are synchronous, where processing is done in fixed time steps regulated by a common clock signal. Synchronous design methods and tools are highly evolved, enabling large design teams to develop extremely complex chips and systems. Synchronous digital logic is a cornerstone for processors and system-on-chip devices (SOCs) that power our digital age.

Asynchronous digital circuits may play crucial niche roles in today's primarily synchronous digital systems. For example, flip-flops—the essential storage elements in synchronous systems—are small asynchronous state machines, constructed with basic logic gates and employing combinatorial feedback to hold state. While asynchronous circuits can have speed and power advantages over synchronous circuits, they are difficult to design. In synchronous state machines, the clock controls the interval between state changes; hence, the next state value is allowed to become stable before being sampled. In contrast, the timing of state changes in asynchronous state machines may be irregular, based on variable combinatorial logic delays. Furthermore, asynchronous state machines are susceptible to multi-path delays that can cause signal glitches, which in turn may cause erroneous state changes. In spite of these difficulties, asynchronous circuits may fill important roles in digital systems.

While less ubiquitous than flip-flops, asynchronous timer circuits may be used for generating clock signals, generating strobes in memory arrays and aligning signals on parallel interfaces. Basic asynchronous timer functions include clock generation, pulse generation and shaping, and time-shifting signals. Digital asynchronous timer circuits mark the passing of time by how long it takes signals to pass through a group of digital logic gates. Asynchronous timers stand in stark contrast with synchronous timers where an external reference clock is the basis for marking time. In asynchronous timers, timing intervals are a function of both fixed factors e.g. circuit structure, and variable factors e.g. manufacturing process variations, operating voltage and operating temperature.

Consequently, timing characteristics of delays, pulses and clocks produced by digital asynchronous timers are imprecise and variable. Still, many applications may tolerate that imprecision and variability.

Digital delay lines, ring oscillators and asynchronous ripple counters are building blocks for traditional asynchronous timing circuits. Each building block is discussed here.

The digital delay line is a linear chain of logic gates where the amount of time it takes a signal to propagate through the gate chain constitutes a time interval. Time intervals are made programmable by segmenting the gate chains and using multiplexers to steer signals through selected segments. See FIG. 1 for an example. Digital delay lines are useful for small delays, but they may not scale well because delay is a linear function of the number of logic gates in the gate chain. Hence, implementing a long-duration time interval with a digital delay line consumes a lot of space and thus is costly.

A ring oscillator may comprise an odd number of inverting gates (i.e. NOT, NAND and/or NOR gates) connected in a circular chain as illustrated in FIG. 2. Each gate output may oscillate between zero and one. The oscillation period equals two times the propagation delay through the gate chain. Ring oscillators are well suited for high-frequency clock generation where gate chains are short. A shortcoming of ring oscillators is that the oscillation period is linearly proportional to the length of the gate chain. Long oscillation periods may require large gate chains and may be costly.

An asynchronous ripple counter may consist of a cascaded chain of toggle flip-flops as illustrated in FIG. 3. An external clock or strobe clocks the low-order counter bit. An output of the low-order bit flip-flip clocks the next higher-order bit, and so on. Asynchronous ripple counters are used as frequency dividers where the low-order bit toggles at half the frequency of the input clock and each successive higher order bit toggles at half the rate of the previous bit.

Specific reference is made to U.S. Pat. No. 7,071,751, which includes a hybrid timer circuit. That hybrid timer combines three circuit structures—a ring oscillator, an asynchronous ripple counter and a synchronous counter—as illustrated in FIG. 4 of the instant invention. The hybrid timer of U.S. Pat. No. 7,071,751 is time consuming and costly to construct owing to the disparate nature of each of its three sub-components. Furthermore, programming the hybrid timer is complicated by the need to set a different parameter for each of its three sub-components. A need exists for a low-cost self-timed timer.

BRIEF SUMMARY OF THE INVENTION

All embodiments of the present invention comprise a self-timed timer, hereinafter "self-timed timer or timer". In some embodiments the present invention comprises a self-timed pulse generator, comprising a timer, hereinafter "self-timed pulse generator or pulse generator". In some embodiments the present invention comprises a self-timed data receiver, comprising a pulse generator, hereinafter "self-timed data receiver or data receiver". The present invention is characterized by one or more asynchronous state machines (ASMs). Conventional ASM structures and design methods may be employed for all parts of the present invention. By avoiding complex and/or hybrid device structures the instant invention affords low cost construction and configuration techniques.

As used herein, a timer measures the passing of time. In an asynchronous or self-timed timer, logic propagation delays, rather than an external reference clock, determine the basic unit of time for a timer as disclosed by the instant invention.

In some embodiments a timer comprises a mechanism for selecting the number of time units in a time measurement period or time measurement interval.

A timer can operate over a very wide range of time measurement intervals because the maximum time interval is an exponential function of the number of state bits in the timer. More specifically, a timer comprising n state bits supports time intervals up to $(2^n-1)$ time units. Furthermore, a timer has an area complexity on the order of $n \times \log_2(n)$ where n is the number of state bits. Thus, a timer is more area efficient and hence more cost effective for metering large time periods as compared to a hybrid timer or synchronous timer, wherein the latter requires an external clock circuit.

In summary, a timer or self-timed timer disclosed by the instant invention is characterized by an asynchronous state machine comprising, optionally:

i) a time measurement sequence, comprising a plurality of states in the timer state machine, for measuring time in proportion to a number of executed state transitions;

ii) at least one time measurement done state, comprising a state in the time measurement sequence, for holding between time measurement periods;

iii) a time measurement mode, wherein the timer state machine advances unconditionally through the time measurement sequence and stops on encountering a done state, for executing a time measurement period;

iv) a time measurement enable input that causes the timer state machine to enter the time measurement mode, for initiating a time measurement period; and v) a time measurement done output that indicates a self-timed timer is in the time measurement done state, enabling an external entity to determine when a time measurement period has ended.

A pulse generator may produce both continuous and finite pulse sequences. These operations are referred to as the continuous mode and the pulse mode. In continuous mode or oscillator mode, a pulse generator produces a periodic clock sequence. In pulse mode or trigger mode, an external enable signal launches a string of pulses. The pulse string continues as long as an enable is activated and may be as short as a single pulse.

The pulse generator is characterized by an asynchronous state machine comprising a pulse timer—an instance of the timer in some embodiments of the present invention—and a pulse sequencer. The pulse timer measures the low and high portions of a generated pulse. Programmable parameters may specify the low and high times for a pulse period. A pulse sequencer manages the pulse timer and handles overall control of pulse generation. Employing the same structures and methods as a timer, a pulse generator has a conventional structure and a cost efficient design. A pulse generator of the present invention can operate over a wide range of pulse intervals and pulse widths owing to the area efficiency of the pulse timer.

In summary, a pulse generator may produce a singular unit pulse and periodic unit pulse sequences; wherein the unit pulse comprises low and high phases, optionally, alternating. "Low" and "high" refer to signal amplitude. "Phase" refers to a portion of a unit pulse sequence—the time—when the signal is at a particular amplitude. Digital signals have two stable amplitude ranges to represent zeros or ones. A unit pulse, being a digital signal, has times when it is low and times when it is high. Each of those separate low and high times are a phase of the unit pulse. Furthermore, each phase is a distinct time measurement period. Technically, it is possible for two consecutive time measurement periods in a unit pulse to generate the same output level, but externally they would be viewed as a single phase.

A pulse generator comprises a pulse sequencer, comprising an asynchronous state machine, wherein pulse sequencer state machine of the asynchronous state machine comprises a state for each phase in the unit pulse, for controlling the generation of the unit pulse; a pulse output for delivering the unit pulses; and a pulse timer, comprising a self-timed timer, as previously described, for measuring duration of pulse phases.

A data receiver receives data from an asynchronous two-wire bit-channel and generates a write strobe—using a pulse generator—for each received bit. Together, the bit-channel and the data receiver form the physical layer foundation for building high-speed, asynchronous, on-chip networks.

In summary, a data receiver receives data from a two-wire asynchronous communications channel. At any given time, the two-wire channel conveys a two-bit code word representing a single bit of information. A transition on any one wire indicates a new information bit. A data receiver comprises: two receive data inputs, for monitoring data on the two-wire channel; a data detector, characterized by an asynchronous state machine, comprising (a) a wait odd state, for waiting for an odd parity code word on the receive data inputs b) a store odd state, for generating a write strobe for datum decoded from an odd parity code word; (c) a wait even state, for waiting for an even parity code word on the receive data inputs; and (d) a store even state, for generating a write strobe for the datum decoded from an even parity code word; a write data output, for reporting received data values; a write strobe output, for delivering the write strobes to capture the received data values on the write data output; and the pulse generator previously described for generating the write strobes. The data receiver forwards the recovered data via the write data output to an external entity (e.g. a receive queue). The write strobe tells the external entity when to sample the received data on the write data output.

BRIEF DESCRIPTION OF THE SEVERAL VIEWS OF THE DRAWINGS

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention. New embodiments may comprise features and/or elements found in the disclosed embodiments.

FIG. 2 (prior art) is a gate-level schematic diagram of an exemplary ring oscillator.

FIG. 3 (prior art) is a schematic diagram of an exemplary asynchronous ripple counter.

FIG. 6 is a truth table comparing the functions of a basic SR latch and an enhanced SR latch.

FIG. 9 is the timer state table.

FIG. 13, comprising parts A and B, is a truth table for an exemplary 5-bit gray decrement set-reset logic circuit.

FIG. 14 includes the logic equations for an exemplary 5-bit gray decrement set-reset logic circuit.

FIG. 15 includes the generalized logic equations for an n-bit gray decrement set-reset logic circuit.

FIG. 21 is the state table for the pulse sequencer.

FIG. 29 is the state table for the data detector.

DETAILED DESCRIPTION OF THE INVENTION

In the following description, numerous specific details are set forth to provide a thorough understanding of the present invention. However, it will be apparent to one of ordinary skill in the art that the invention may be practiced without these particular details. In other instances, methods, procedures, and components that are well known to those of ordinary skill in the art are not described in detail to avoid obscuring aspects of the present invention.

In digital logic, an asynchronous state machine (ASM) has much in common with an ordinary synchronous state machine. Both may have (1) storage elements, e.g. latches or flip-flops, which hold a current state; (2) deterministic state transitions based on combinatorial functions of current state and external input signals; and (3) output signals that are combinatorial functions of current state and input signals. Additionally, both may have an external reset input that forces the state machine to a start state. There is, however, one fundamental difference between an asynchronous state machine and a synchronous state machine: ASMs have no externally supplied clock to periodically advance state. Instead, clocks must be generated within the asynchronous state machine itself. Each ASM state storage element may have a unique clock signal, which is a combinatorial function of current state and external input signals.

Figure 1:
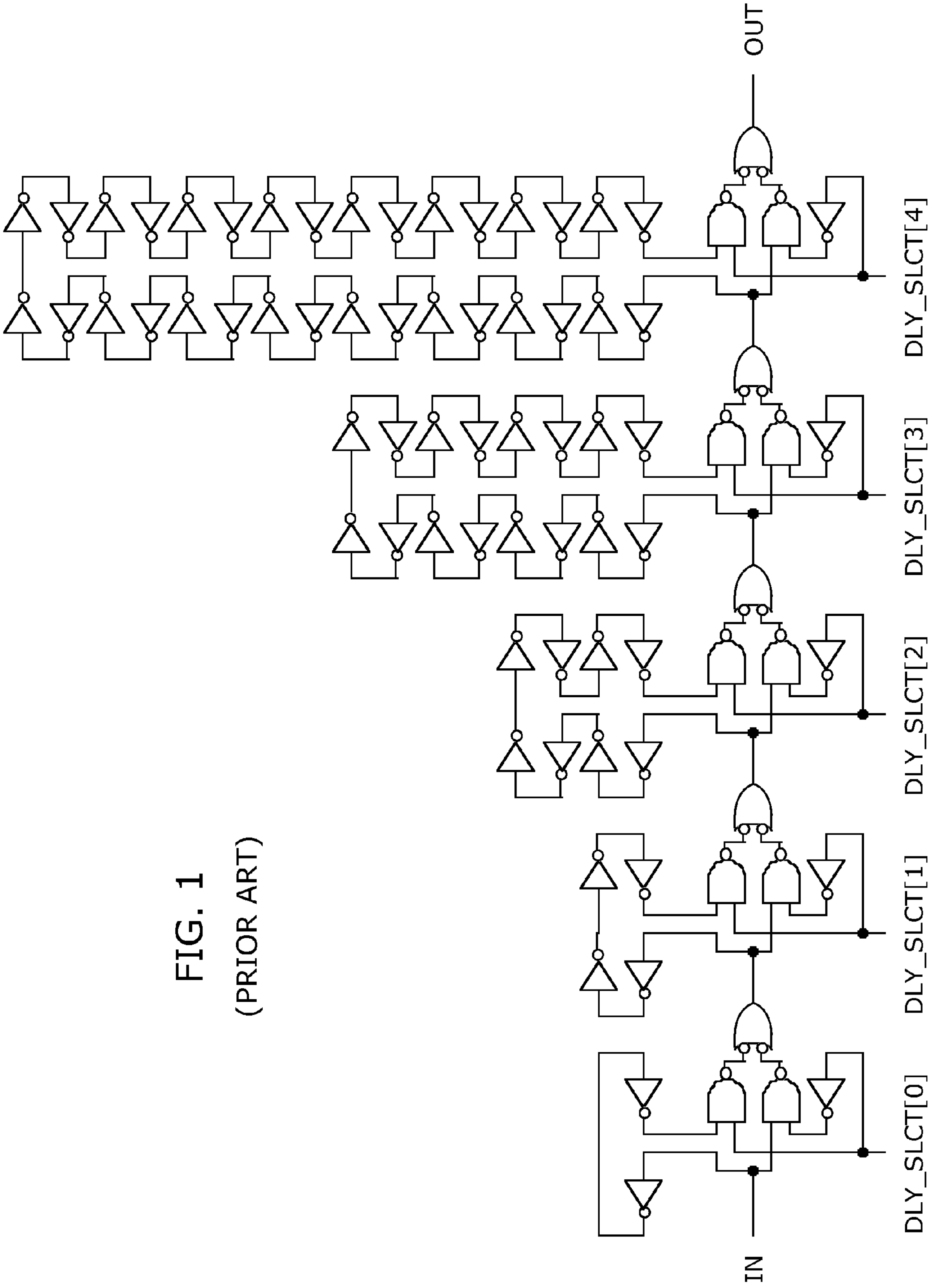
FIG. 1 (PRIOR ART)
FIG. 1 (prior art) is a gate-level schematic diagram of an exemplary programmable digital delay line.
Figure 4:
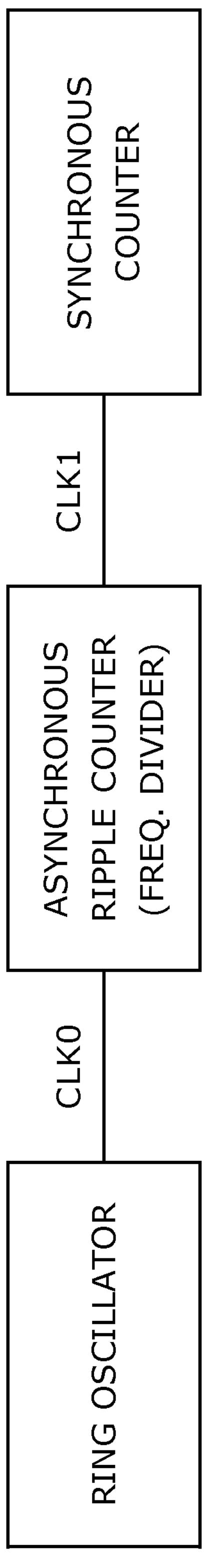
FIG. 4 (PRIOR ART)
FIG. 4 (prior art) is a block diagram of the hybrid timer used in U.S. Pat. No. 7,071,751.
Figure 5:
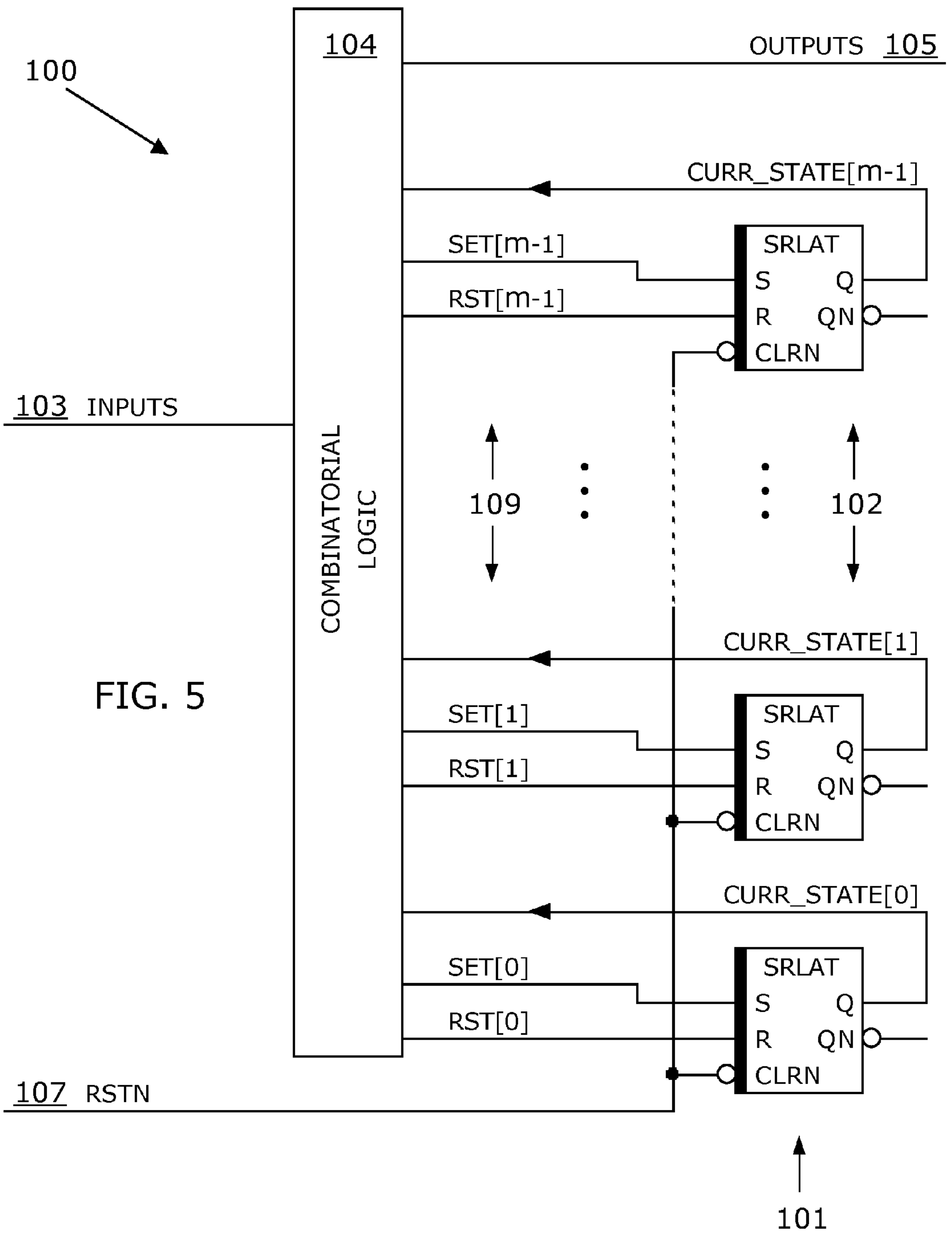
FIG. 5 is a block diagram of a generalized asynchronous state machine.
Figure 7:
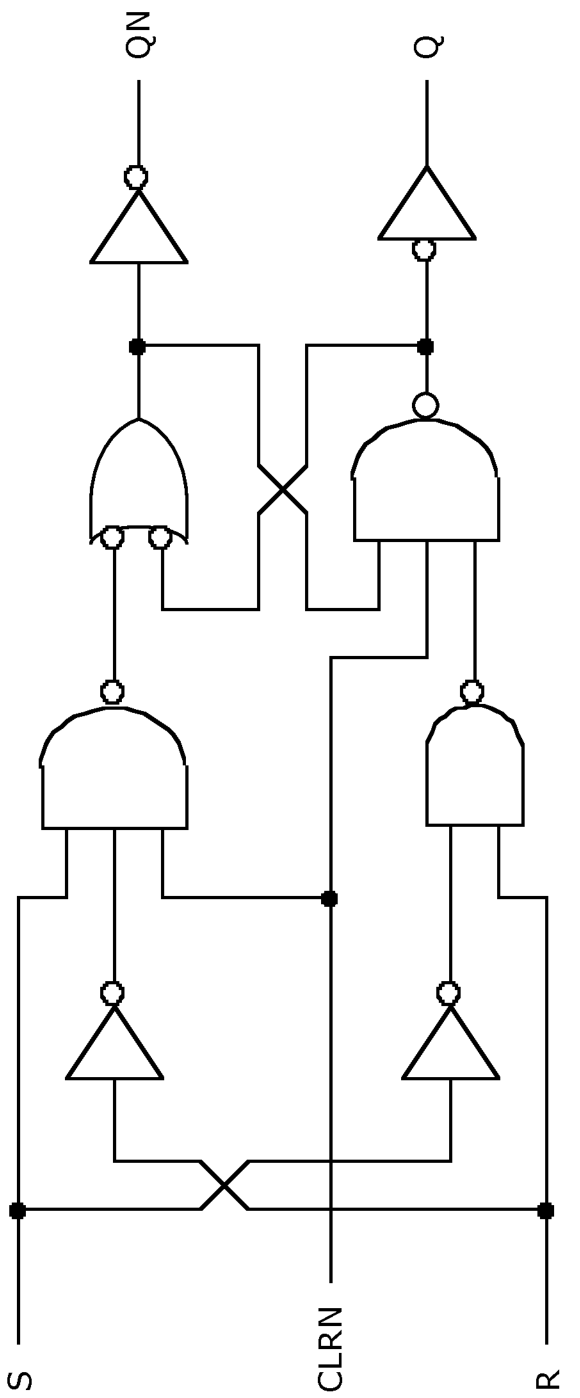
FIG. 7 is an exemplary gate-level schematic diagram of an enhanced SR latch.

FIG. 5 is a block diagram of a generalized asynchronous state machine 100, of the present invention. Current state is stored in enhanced SR latches 101 and represented by signal CURR_STATE 102 driven from the Q output of enhanced SR latches 101. An enhanced SR latch differs from a basic SR latch when inputs S and R are asserted simultaneously. In that situation, the enhanced SR latch holds the current state, whereas the basic SR latch goes to an undefined state with outputs Q and QN presenting the same value. The truth table in FIG. 6 illustrates this functional difference between the basic SR latch and the enhanced SR latch. FIG. 7 is an exemplary gate-level schematic of the enhanced SR latch. Hereinafter, references to SR latches which do not distinguish between basic SR latches and enhanced SR latches are assumed to be enhanced SR latches.

Some embodiments of the present invention comprise enhanced SR latches for state storage. Alternate embodiments may comprise ad hoc combinatorial feedback, basic SR latches, dual-edge-triggered SR flip-flops, toggle flip-flops, and/or other storage element types for state storage. Some embodiments of the present invention comprise enhanced SR latches with an active-high set input, S. Alternative embodiments may comprise enhanced SR latches with an active-low S input. Some embodiments of the present invention comprise enhanced SR latches with an active-high reset input, R. Alternative embodiments may comprise enhanced SR latches with an active-low R input. Some embodiments of the present invention comprise storage elements with an active-low clear input, CLRN. Alternative embodiments may comprise storage elements with an active-high clear input. Some embodiments of the present invention comprise storage elements that clear to 0. Alternative embodiments may comprise storage elements that clear to 1.

Returning to FIG. 5, observe that combinatorial logic 104 generates ASM outputs 105 and current state SET/RST signals 109 based on signal CURR_STATE 102 and ASM inputs 103. SET/RST signals 109 are the ASM clocks. Notice that each individual bit of signal CURR_STATE 102 may have a unique index, shown in square brackets and ranging from 0 to $m-1$, where m is the number of state bits. Associated with each enhanced SR latch 101 may be a unique SET/RST signal 109 with matching index.

ASM input RSTN 107 is an asynchronous reset signal. On assertion, RSTN 107 clears enhanced SR latches 101 to a value of 0. Alternatively, RSTN 107 may set some SR latches 101 to a value of 1, if the ASM start state is non-zero. Optionally, RSTN 107, while asserted, may force clocks (i.e. latch SET/RST signals 109) and selected ASM outputs 105 to their inactive states.

Turn now to the timer of the present invention. In some embodiments a timer comprises a self-timed, asynchronous Gray code counter that meters time. A Gray code counter is characterized by a value progression where only one counter bit changes during each advance to the next count. Herein, "meters time" means to measure time or to mark the passing of time. The duration of a time measurement period is determined by how long it takes the self-timed Gray code counter to decrement, and may be based on internal logic delays, from a starting value down to zero, a done state. Each "decrement" constitutes one time unit. That progression through the Gray code sequence is the time measurement sequence. A timer comprises a state for each Gray code value in the Gray code counter, hence the association of a Gray code sequence with the time measurement period—a summation of time units. A time measurement period refers to the amount of time it takes to advance through a specific Gray code sequence.

While some embodiments of the timer use a Gray code sequence for the time measurement sequence, any Hamming distance-1 binary code sequence is suitable. An important requirement is that only one state bit changes between consecutive states in the time measurement sequence.

A timer's Gray counter can be any number of bits wide. Counter width determines the timer's range—the maximum amount of time it can meter. Widening the counter by one bit doubles its range. Narrowing the counter by one bit halves its range. Changing the timer's counter width changes the maximum time measurement period but does not fundamentally change the nature of the present invention. Speaking generally, a timer's Gray counter is "n" bits wide.

Figure 8:
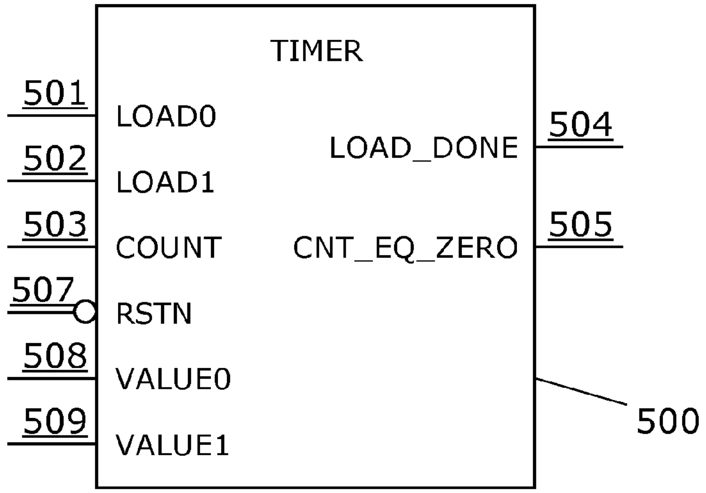
FIG. 8 is a black box diagram of the timer showing its inputs and outputs.

FIG. 8 is a black box diagram of an exemplary embodiment of the timer 500. Timer inputs include LOAD0 501, LOAD1 502, COUNT 503, RSTN 507, VALUE0 508 and VALUE1 509. Timer outputs include LOAD_DONE 504 and CNT_EQ_ZERO 505. Inputs VALUE0 508 and VALUE1 509 are n-bit signals, where n is the Gray counter width in bits. All other timer inputs and outputs may be 1-bit signals.

FIG. 9 is a timer state table. In an exemplary embodiment, the timer has five valid operating modes—RESET 510, IDLE 511, LOAD0 512, LOAD1 513 and COUNT 514. Operating mode is determined by timer inputs RSTN 507, LOAD0 501, LOAD1 502 and COUNT 503. Observe that RSTN 507 is an active-low signal; it is active when 0. Other mode select inputs are active-high; they are active when 1. If no timer mode select inputs are asserted, timer mode is IDLE 511. Timer mode is UNSPECIFIED 515 if more than one of mode select inputs LOAD0 501, LOAD1 502 and COUNT 503 are asserted simultaneously while RSTN 507 is de-asserted.

When switching among operating modes LOAD0 512, LOAD1 513 and COUNT 514, timer mode select inputs LOAD0 501, LOAD1 502 and COUNT 503 may be de-asserted, at least briefly, between assertions of these individual mode select inputs. That means the timer will pass through mode IDLE 511 on transition between modes LOAD0 512, LOAD1 513 and COUNT 514. This practice prevents timer mode from becoming UNSPECIFIED 515.

In mode RESET 510, the timer's n-bit counter is set to zero. RSTN 507 must be asserted—held low—for a minimum time sufficient to clear state storage elements (e.g. enhanced SR latches) holding the counter value. No more than one other mode select input LOAD0 501, LOAD1 502 or COUNT 503—may be asserted when RSTN 507 is de-asserted.

In mode LOAD0 512, the timer's n-bit counter value, CNT 518, is set to the n-bit Gray coded value on timer input VALUE0 508. Specifically, each counter bit may be set or reset depending on whether the corresponding bit of input VALUE0 508 is 1 or 0, respectively. Once CNT 518 equals VALUE0 508, timer output LOAD_DONE 504 is asserted.

In mode LOAD1 513, the timer's n-bit counter value, CNT 518, is set to the n-bit Gray coded value on timer input VALUE1 509. Specifically, each counter bit may be set or reset depending on whether the corresponding bit of input VALUE1 509 is 1 or 0, respectively. Once CNT 518 equals VALUE1 509, timer output LOAD_DONE 504 is asserted.

In mode COUNT 514, the timer's n-bit counter decrements repeatedly, deterministically and unconditionally—in Gray code sequence—until the counter value, CNT 518, is zero. After entering mode COUNT 514, no further input signal changes are needed for the timer to traverse the decrement sequence to zero. Once in mode COUNT 514, the time it takes the counter to reach zero may depend on internal logic delays in some embodiments. Using the Gray sequence means that no more than one counter bit changes at any given time, ensuring predictable glitch-free counting. Once CNT 518 equals zero, counting stops and timer output CNT_EQ_ZERO 505 is asserted.

In modes other than COUNT 514, timer output CNT_EQ_ZERO 505 may either (1) reflect the current counter value CNT 518—that is, be asserted when CNT 518 equals zero or (2) be de-asserted.

In some exemplary embodiments of the timer, recognize that when CNT 518 equals zero, the timer state machine is in the time measurement done state.

In some exemplary embodiments of the timer, recognize that output CNT_EQ_ZERO 505 is the time measurement done output. When output CNT_EQ_ZERO 505 is asserted the exemplary timer state machine is in its time measurement done state.

In alternative timer embodiments, the time measurement done state may be when CNT 518 equals the requested load value. In these alternative timer embodiments, output LOAD_ DONE 504 is the time measurement done output.

In exemplary embodiments of the timer, recognize that mode COUNT 514 is the time measurement mode. Mode COUNT 514 is when the timer state machine advances unconditionally through at least a portion of a time measurement sequence, measuring time in proportion to the number of steps or state transitions between the starting count and zero or some other done state.

In some exemplary embodiments of the timer, recognize that input COUNT 503 is a time measurement enable input. Assertion of input COUNT 503 causes a timer state machine to enter the time measurement mode.

In some exemplary embodiments of a timer, recognize that inputs LOAD0 501, VALUE0 508, LOAD1 502 and VALUE1 509 are time measurement duration select inputs. These inputs select a starting state in a time measurement sequence, thus these inputs control the duration of a time measurement period.

In some exemplary embodiments of a timer, recognize that output LOAD_DONE 504 is a timer ready output. It indicates that the current count has been set to the requested starting count, and the timer is ready to execute a time measurement period.

In some exemplary embodiments of a timer, a timer done state and a timer ready state are different states. Specifically, a timer done state is when current count equals zero or some other done state, and a timer ready state is when current count equals the starting count for the time measurement period. In alternative embodiments, a timer done state and a timer ready state may be the same state.

Figure 10:
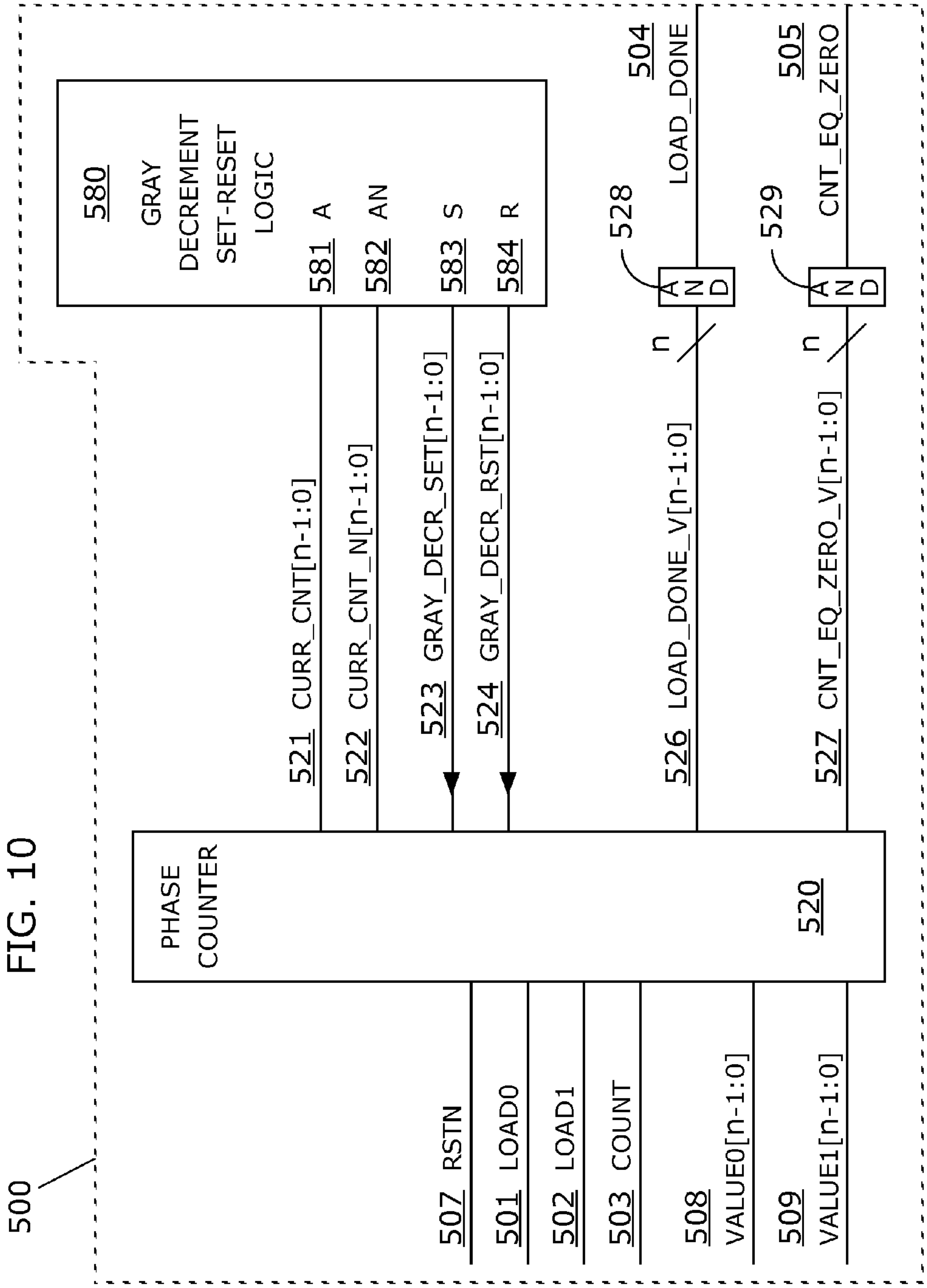
FIG. 10 is a top-level schematic diagram of the timer showing two sub-blocks—the phase counter and the gray decrement set-reset logic.

FIG. 10 is a top-level schematic diagram of timer 500. Sub-block phase counter 520 comprises stored current count and mode control logic for updating current count value. Sub-block Gray decrement set-reset logic 580 determines which count bit is set or reset to advance the counter to the next value in the Gray code decrement sequence. AND gates 528 and 529 perform data reductions to produce timer status outputs LOAD_DONE 504 and CNT_EQ_ZERO 505, respectively.

Several signals shown in FIG. 10 are appended with their bit range "[n−1:0]", highlighting the fact that they are n-bit signal vectors, the same width as the timer's counter. The bit range provides a more detailed view of the signal, but does not change its structure or function.

In FIG. 10, timer inputs RSTN 507, LOAD0 501, LOAD1 502, COUNT 503, VALUE0 508 and VALUE1 509 are fed into phase counter 520. Gray decrement set-reset logic 580 processes the n-bit CURR_CNT 521 value and its complement, CURR_CNT_N 522, from the phase counter 520 and produces two n-bit zero-/one-hot vectors—GRAY_DECR_SET 523 and GRAY_DECR_RST 524—which tell the phase counter 520 which counter bit to flip to advance the count to the next value in the Gray code decrement sequence. Phase counter 520 generates two n-bit counter status signals—LOAD_DONE_V 526 and CNT_EQ_ZERO_V 527. A multi-bit signal is "zero-hot" when none of the bits are asserted. A signal is "one-hot" when exactly one bit is asserted. A "zero-/one-hot" signal is one in which no more than one bit may be asserted at any given time.

LOAD_DONE_V 526 is a bit-wise indicator of whether a phase counter load operation has completed when either input LOAD0 501 or LOAD1 502 is asserted. The n bits of LOAD_DONE_V 526 are ANDed together by AND gate 528 to produce single-bit timer status output LOAD_DONE 504.

CNT_EQ_ZERO_V 527 is a bit-wise indicator of when the phase counter value is zero. The n bits of CNT_EQ_ZERO_V 527 are ANDed together by AND gate 529 to produce single-bit timer status output CNT_EQ_ZERO 505.

Figure 11:
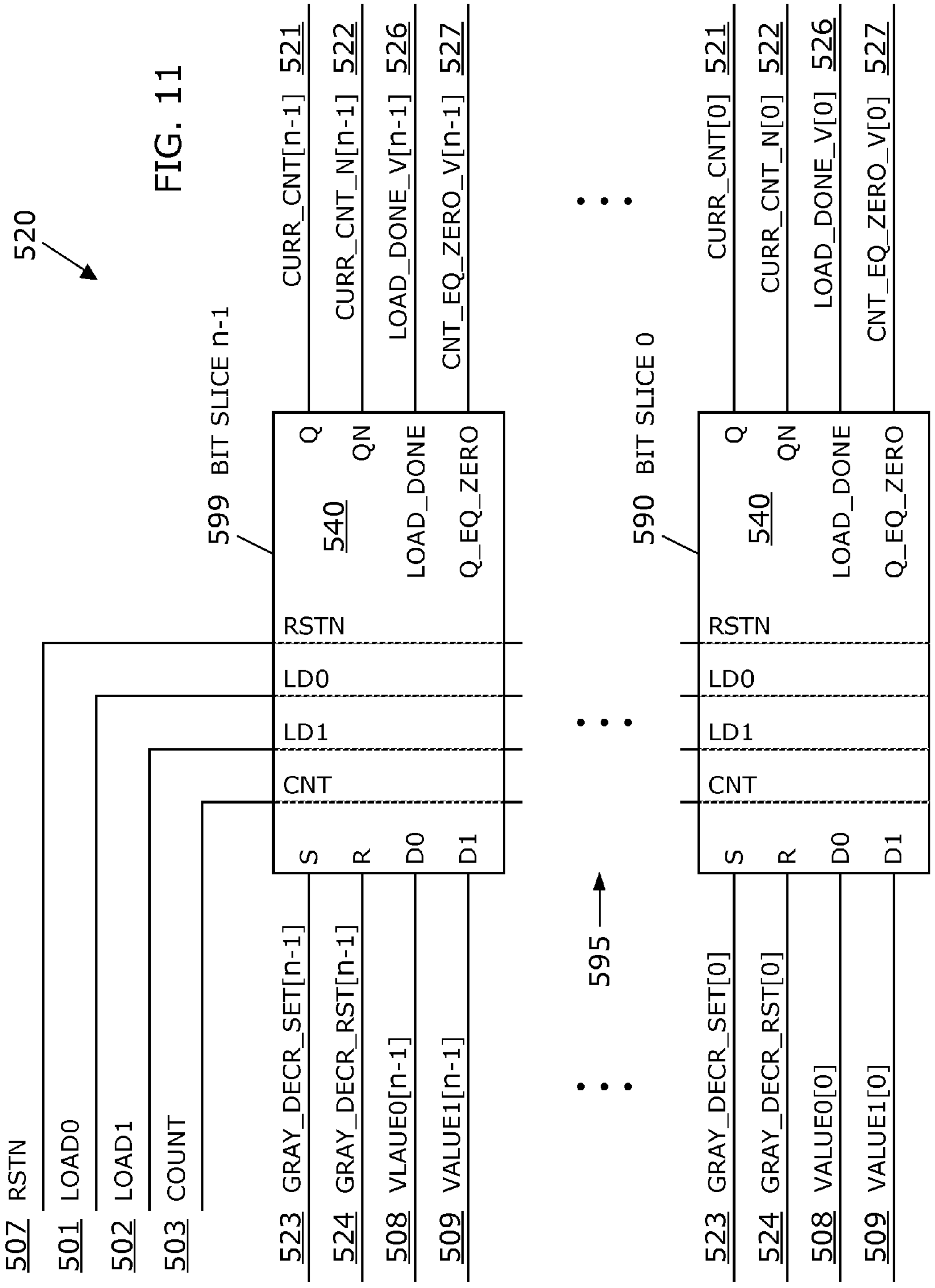
FIG. 11 is a block diagram of the phase counter showing that it is composed of a plurality of delay counter bit slice blocks.

FIG. 11 illustrates the structure of phase counter 520. It may consist of n identical phase counter bit slices 540. The drawing explicitly shows high-order bit slice n−1 599 and low-order bit slice 0 590. The existence of intervening bit slices n−2 through 1 is implied by vertical ellipses 595.

Single-bit timer inputs RSTN 507, LOAD0 501, LOAD1 502, and COUNT 503 are broadcast to all phase counter bit slices 540. Vectored timer inputs VALUE0 508 and VALUE1 509 are bit-wise distributed to respective phase counter bit slice 540. That is, VALUE0[0] goes to phase counter bit slice 0 590; VALUE0[1] goes to phase counter bit slice 1 (not shown); . . . VALUE0[n−1] goes to phase counter bit slice n−1 599. Likewise, vectored timer inter-sub-block signals CURR_CNT 521, CURR_CNT_N 522, GRAY_DECR_SET 523, GRAY_DECR_RST 524, LOAD_DONE_V 526 and CNT_EQ_ZERO_V 527 are bit-wise distributed to respective phase counter bit slices.

Figure 12:
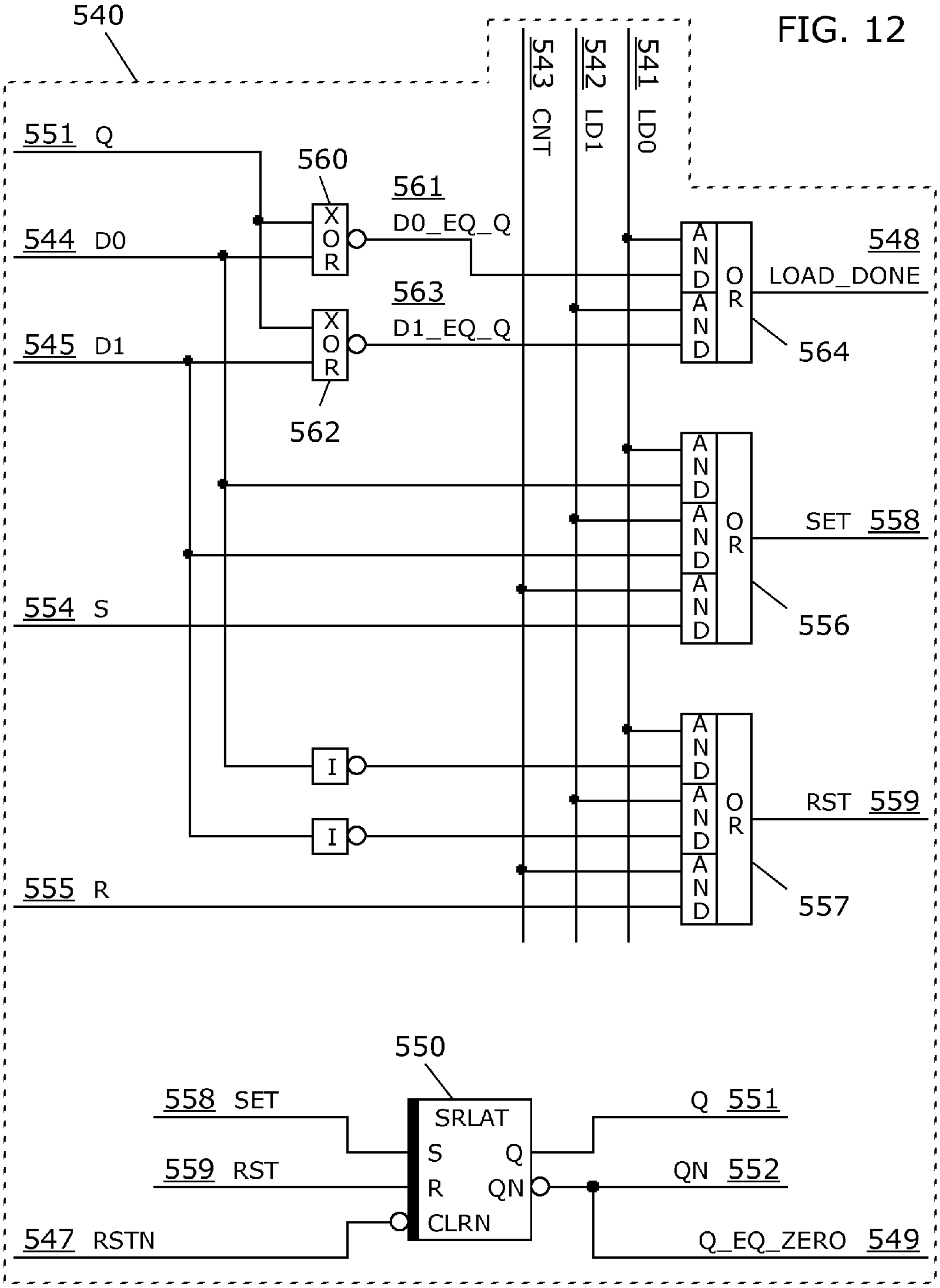
FIG. 12 is a gate-level logic schematic of the delay counter bit slice block.

FIG. 12 is a gate-level schematic diagram of phase counter bit slice 540. Each phase counter bit slice 540 may include a single enhanced SR latch, SRLAT 550, which stores one bit of the phase counter's current count value. The currently stored value in the SRLAT 550 is reflected on latch outputs Q 551 and QN 552—the true and complement values, respectively.

Phase counter bit slice 540 includes two equivalence checkers—XNOR gates in the schematic—D0-versus-Q comparator 560 and D1-versus-Q comparator 562. D0-versus-Q comparator 560 continuously compares input D0 544 with latch output Q 551 to produce signal D0-equals-Q or D0_EQ_Q 561. D1-versus-Q comparator 562 continuously compares input D1 545 with latch output Q 551 to produce signal D1-equals-Q or D1_EQ_Q 563.

Bit slice 540 includes three multiplexers—appearing as AND-OR structures in the schematic—load done multiplexer 564, count bit set multiplexer 556 and count bit reset multiplexer 557. Load done multiplexer 564 drives bit slice output LOAD_DONE 548. Count bit set multiplexer 556 drives signal SET 558, which goes to S input of SRLAT 550. Count bit reset multiplexer 557 drives signal RST 559, which goes to R input of SRLAT 550.

Phase counter bit slice inputs LD0 541, LD1 542 and CNT 543 enable actions within bit slice 540. At most one of these signals shall be asserted at any given time. That means the three signals must be de-asserted just prior to asserting any one.

Assertion of phase counter bit slice input LD0 541 causes the bit value stored in the SRLAT 550 to be set or reset via the count bit set multiplexer 556 and the count bit reset multiplexer 557, respectively, depending on whether the value of input D0 544 is 1 or 0, respectively. Concurrently, D0-versus-Q comparator 560 reports when output Q 551 equals input D0 544 on signal D0_EQ_Q 561. While LD0 541 is asserted, the load done multiplexer 564 selects the value of signal D0_EQ_Q 561 to be driven on output LOAD_DONE 548. Note: Input D0 544 shall not change values while input LD0 541 is asserted.

Assertion of phase counter bit slice input LD1 542 causes the bit value stored in the SRLAT 550 to be set or reset via the count bit set multiplexer 556 and the count bit reset multiplexer 557, respectively, depending on whether the value of input D1 545 is 1 or 0, respectively. Concurrently, D1-versus-Q comparator 562 reports when output Q 551 equals input D1 545 on signal D1_EQ_Q 563. While LD1 542 is asserted, the load done multiplexer 564 selects the value of signal D1_EQ_Q 563 to be driven on output LOAD_DONE 548. Note: Input D1 545 shall not change values while input LD1 542 is asserted.

Assertion of phase counter bit slice input CNT 543 enables the stored count bit in SRLAT 550 to be set or reset depending on bit slice inputs S 554 and R 555, respectively. Signal SET 558 is true if CNT 543 and S 554 are both true. Signal RST 559 is true if CNT 543 and R 555 are both true. During a counting period it is possible that a phase counter bit will be set and reset multiple times. In any case, in a given phase counter bit slice 540, assertion of phase counter bit slice inputs S 554 and R 555 is non-overlapping.

In some embodiments of the present invention, phase counter bit slice output Q_EQ_ZERO 549 is asserted whenever the value stored in SRLAT 550 is 0, regardless of timer operating mode. In alternative embodiments, output Q_EQ_ZERO 549 may be gated by input CNT 543. In that case, Q_EQ_ZERO 549 is asserted when CNT 543 is 1 and the value stored in the SRLAT 550 is 0.

Bit slice input RSTN 547 is an active-low reset signal. Assertion of RSTN 547 clears the currently stored value in the SRLAT 550. The reset value of the SRLAT 550 is 0. On de-assertion of RSTN 547, no more than one of bit slice inputs LD0 541, LD1 542 and CNT 543 may be asserted.

Returning to FIG. 10, consider Gray decrement set-reset logic 580. Gray decrement set-reset logic 580 is a combinatorial logic block used during timer mode COUNT 514. Gray decrement set-reset logic input A 581 is the current count value and input AN 582 is the complement of the current count value. Output S 583 is a zero-/one-hot set vector indicating which phase counter bit is to be set to 1 to produce the next value in the Gray code decrement sequence. Output R 584 is a zero-/one-hot set vector indicating which phase counter bit is to be reset to 0 to produce the next value in the Gray code decrement sequence. The phase counter is non-wrapping. Hence, Gray decrement set-reset logic outputs S 583 and R 584 are all zeros when input A 581 is all zeros.

Nominally, between Gray decrement set-reset logic outputs S 583 and R 584, no more than one bit may be a 1 at any given time. In this case, the qualifier "nominally" acknowledges that there can be a brief overlap between two one-hot values when a new bit turns on as the previous bit turns off.

That overlap may be okay if the ratio between the longest and shortest phase counter latch-to-latch timing paths is less than 2:1. This timing relationship must be maintained for ASM latch-to-latch paths.

FIG. 13 (parts A and B) presents the truth table for an exemplary 5-bit Gray decrement set-reset logic block. FIG. 14 shows the logic equations for the exemplary 5-bit Gray decrement set-reset logic block. FIG. 15 shows the logic equations for a generalized n-bit Gray decrement set-reset logic 580. One skilled in the art of digital logic design can readily implement the Gray decrement set-reset logic 580 using the exemplary truth table in FIG. 13, the exemplary logic equations in FIG. 14 and the generalized logic equations in FIG. 15.

An exemplary embodiment of a timer comprises a non-wrapping Gray code counter. That is, a Gray code counter that stops decrementing when it reaches zero. Alternative timer embodiments may comprise a Gray code counter that on reaching zero wraps to the maximum Gray code value supported by the counter, or some other non-zero value with just one bit set to 1 and all other bits set to zero. This alternative Gray code counter may enable the timer to become an oscillator, continuously cycling through a Gray code sequence.

An exemplary embodiment of the timer comprises two load-control/load-value input pairs—LOAD0 501/VALUE0 508 and LOAD1 501/VALUE1 509. Alternative timer embodiments may comprise a different number of load-control/load-value input pairs. For example, an alternative timer embodiment may comprise just one load-control/load-value input pair. Another alternative timer embodiment may comprise three load-control/load-value input pairs.

An exemplary embodiment of the timer comprises full-range load-value selection. That is, load-value inputs VALUE0 508 and VALUE1 509 can specify any possible starting state in the time measurement sequence. Alternative timer embodiments may comprise limited load-value selection. For example, an alternative timer embodiment with six counter bits may have a three-bit load-value input allowing for up to eight predetermined load values from the 64 possible load values for a six-bit counter.

An exemplary embodiment of the timer comprises an explicit mechanism, using load-value inputs VALUE0 508 and VALUE1 509, for selecting the value for the counter at the start of a time measurement period. An alternative timer embodiment may forgo the load value inputs and may instead have a fixed a priori value associated with each load-control input.

An exemplary embodiment of the timer comprises an explicit mechanism, using load-control inputs LOAD0 501 and LOAD1 502, for externally initializing the timer for a time measurement period. Alternative timer embodiments may comprise an implicit mechanism for priming the timer for a time measurement period. In one such alternative, the timer would automatically prime itself at the end of a time measurement period after the count reaches zero. In another such alternative, the timer would automatically load the starting count on initiation of a time measurement period. In either alternative, a load-value input may select the starting state for the time measurement period.

An exemplary embodiment of the timer comprises level-triggered load-control inputs. An alternative embodiment of the present invention may comprise edge-triggered load-control inputs.

An exemplary embodiment of the timer comprises a level-triggered input COUNT 503—for enabling execution of a time measurement period. An alternative timer embodiment may comprise an edge-triggered input for executing a time measurement period.

An exemplary embodiment of the timer comprises a selectable start state and a fixed done state in the time measurement sequence. An alternative timer embodiment could have a fixed start state and a selectable done state. In another alternative timer embodiment, both start state and done state may be selectable. In yet another alternative timer embodiment, both start state and done state may be fixed.

Turn now to a pulse generator of the present invention. In oscillator or continuous mode, a pulse generator produces a periodic clock sequence. Because the disclosed circuit is self-timed, it does not rely on an external reference clock. Consequently, the period of the generated clock varies as a function of process, voltage and temperature (PVT). In pulse or trigger mode, an external enable signal launches a string of pulses. The pulse string continues as long as the enable is activated and may be as short as a single pulse.

A basic pulse generator output is a unit pulse. A unit pulse has a nominal duration and comprises at least one phase. Phases are portions of a unit pulse's nominal duration where its amplitude is either low or high. Some pulse generator embodiments have a unit pulse comprising a low phase, followed by a high phase with a return to low at the end of the high phase. A "zero" in a code sequence refers to a "low phase"; a "1" refers to a high phase. A time unit associated with a "zero" may be different from a time unit associated with a "1".

Figure 16:
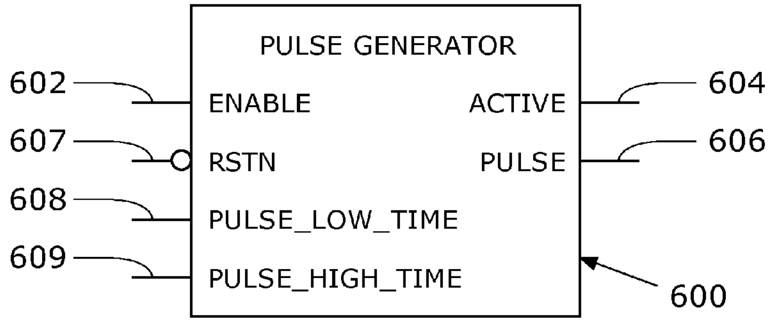
FIG. 16 is a black box diagram of the pulse generator showing its inputs and outputs.

FIG. 16 is a black box diagram of the pulse generator 600 that shows its input ports—ENABLE 602, RSTN 607, PULSE_LOW_TIME 608 and PULSE_HIGH_TIME 609 and its output ports—ACTIVE 604 and PULSE 606. Inputs PULSE_LOW_TIME 608 and PULSE_HIGH_TIME 609 are n-bit signals, where n is the width in bits of the pulse generator's delay counter. Other pulse generator inputs and outputs are 1-bit signals.

Figure 17:
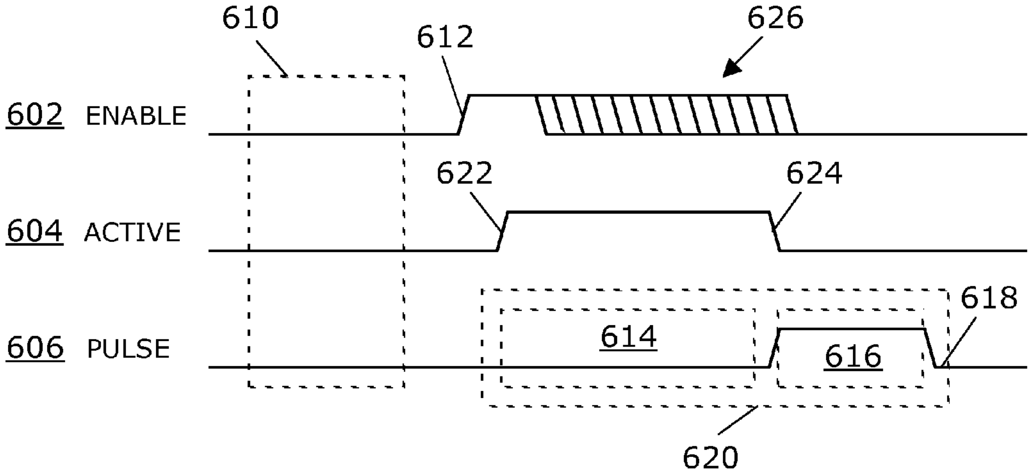
FIG. 17 is a functional timing diagram of the pulse generator illustrating the generation of a single pulse.
Figure 18:
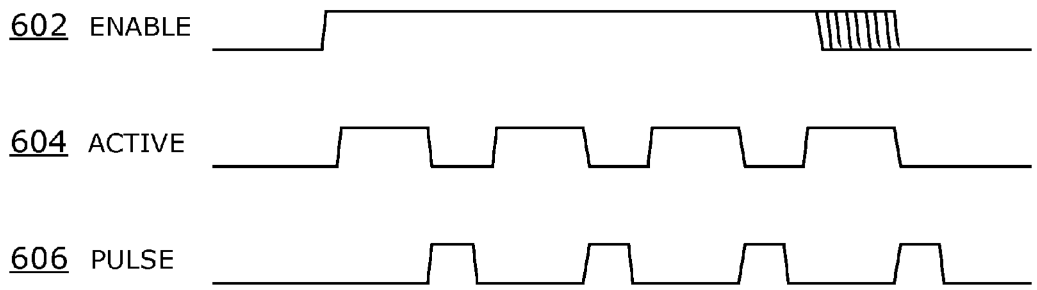
FIG. 18 is a functional timing diagram of the pulse generator illustrating the generation of a multiple-pulse sequence.

FIG. 17 is a functional timing diagram of pulse generator 600 that illustrates the generation of a single pulse cycle 620. FIG. 17 shows those pulse generator inputs and outputs—ENABLE 602, ACTIVE 604 and PULSE 606—that are actively switching during pulse generation. Inputs RSTN 607, PULSE_LOW_TIME 608 and PULSE_HIGH_TIME 609 are expected to remain static during pulse generation. FIG. 18 is a functional timing diagram of the pulse generator 600 that illustrates the generation of a multiple-pulse sequence.

As shown in FIG. 17, pulse generator 600 is inactive 610 when input ENABLE 602 and outputs ACTIVE 604 and PULSE 606 are low. Activation occurs when input ENABLE 602 goes high 612. At first, PULSE 606 stays low 614 for a specified time, controlled by input PULSE_LOW_TIME 608, and then goes high 616 for a specified time, controlled by input PULSE_HIGH_TIME 609, and returns to the low state 618. That low-high-low sequence constitutes a single pulse cycle 620. Holding ENABLE 602 high produces a repeating sequence of pulse cycles as illustrated in FIG. 18.

Continuing with FIG. 17, pulse generator output ACTIVE 604 acknowledges that the assertion of input ENABLE 602 has been acted upon and a pulse cycle 620 has begun. Output ACTIVE 604 goes high 622 shortly after the start of a pulse cycle 620 and goes low 624 before the end of a pulse cycle 620. In some embodiments, output ACTIVE 604 goes low around the same time pulse generator output PULSE 606 goes high. Even though output signal ACTIVE 604 has gone low, pulse generator 600 may continue to be active as long as input ENABLE 602 or output PULSE 606 is high. During continuous pulse sequences, output ACTIVE 604 may be low for the latter portion of each pulse cycle as illustrated in FIG. 18.

To terminate a pulse sequence and return pulse generator 600 to its inactive state, pulse generator input ENABLE 602 is de-asserted before the end of a pulse cycle with sufficient margin to prevent the start of a new pulse cycle. In some embodiments input ENABLE 602 is de-asserted 626 while pulse generator output ACTIVE 604 is high. In alternative embodiments, input ENABLE 602 may be de-asserted after output ACTIVE 604 goes low, as long as it is done sufficiently before the end of the pulse cycle. When input ENABLE 602 goes low, the current cycle completes normally before pulse generator 600 returns to its inactive state.

Pulse generator inputs PULSE_LOW_TIME 608 and PULSE_HIGH_TIME 609 specify the initial count used in a phase counter to measure the low and high portions, respectively, of a pulse cycle 620. Pulse low time 614 starts just after activation of input ENABLE 602 and ends just before the rising edge of output PULSE 606. Pulse high time 616 covers the duration of output PULSE 606 being high. Inputs PULSE_LOW_TIME 608 and PULSE_HIGH_TIME 609 shall be held constant while pulse generator 600 is active. Changing them while pulse generator 600 is active could cause unexpected phase times or a metastable event.

Finally, input RSTN 607 is an active-low reset, which forces pulse generator 600 to an initial state. While RSTN 607 is asserted, pulse generator 600 may immediately become inactive and outputs PULSE 606 and ACTIVE 604 are both held low. If RSTN 607 is asserted during a pulse cycle 620, pulse cycle 620 is truncated. While input RSTN 607 is asserted, input ENABLE 602 has no affect.

In some embodiments a pulse generator generates a unit pulse with two phases followed by a return to the initial state for example, first a low phase, then a high phase and a return to low. In alternative pulse generator embodiments, a unit pulse may have a different number of phases, allowing for different unit pulse patterns; for example, a unit pulse may have one phase, two phases or some greater number of phases. In some embodiments of a pulse generator of the instant invention, the pulse output is low during the first phase; in alternative pulse generator embodiments, a pulse output may be high during the first phase. In some embodiments of a pulse generator of the instant invention, a pulse output returns to its initial state on completion of the unit pulse. In alternative pulse generator embodiments, a pulse output may end a unit pulse in the opposite state. In some embodiments of a pulse generator durations of various phases in a unit pulse may be equal; optionally, in some embodiments, durations of various phases in a unit pulse may be unequal.

In some embodiments of a pulse generator of the instant invention, recognize that inputs PULSE_LOW_TIME 608 and PULSE_HIGH_TIME 609 are the phase duration inputs.

Figure 19:
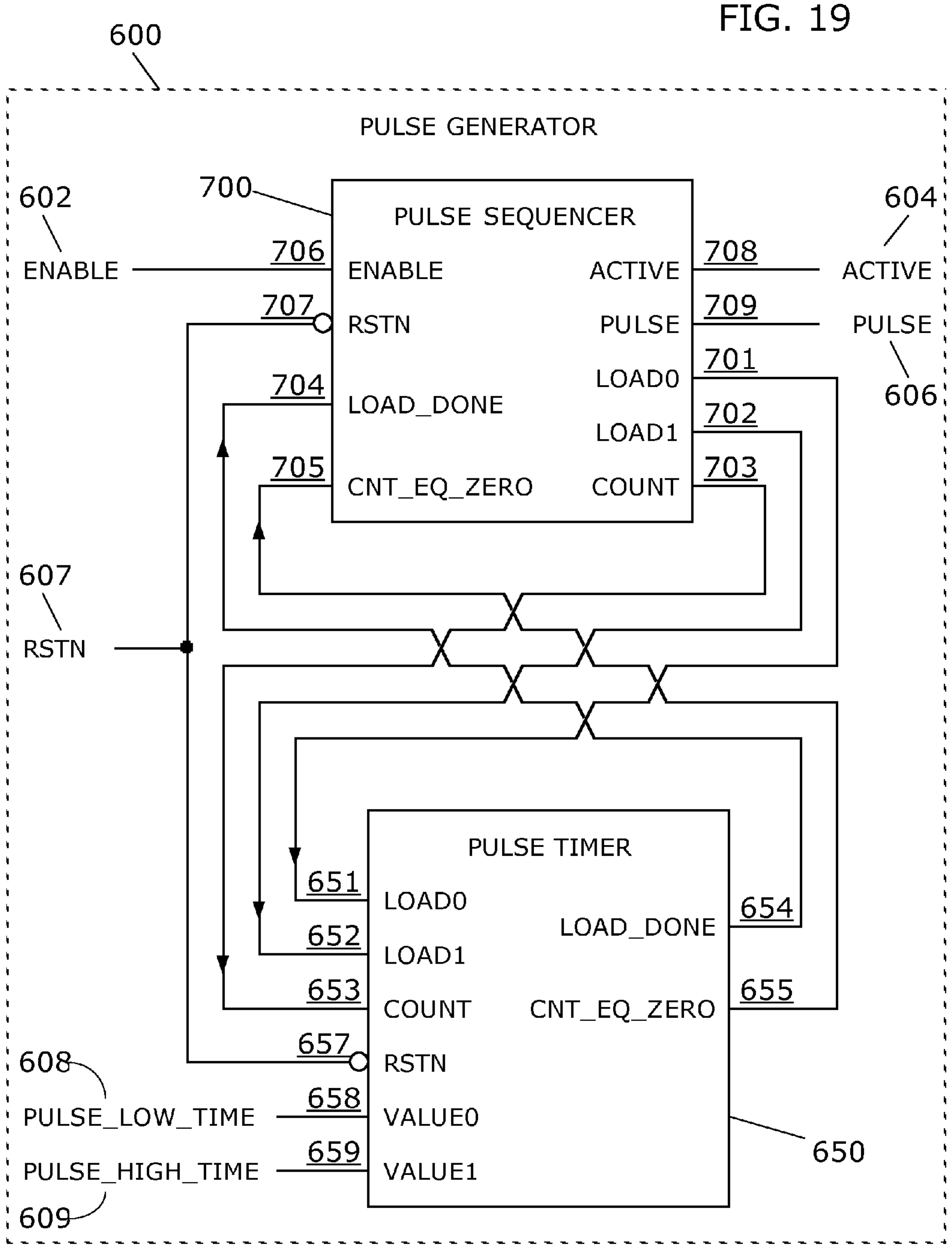
FIG. 19 is a top-level block diagram of the pulse generator showing its two major sub-blocks—the pulse sequencer and the pulse timer—and the connections between them.

FIG. 19 is a block diagram of pulse generator 600 showing its two sub-blocks pulse timer 650 and pulse sequencer 700. Pulse timer 650 is an embodiment of timer 500 of the present invention. More specifically, in some embodiments of pulse timer 650 are embodiments of timer 500 described above. Pulse timer 650 sits at the heart of pulse generator 600, metering delay during a unit pulse. A single pulse timer 650 may measure time during each of the various phases in a unit pulse. Pulse sequencer 700 provides overall control of pulse generator 600, stepping pulse timer 650 through low and high phases of a unit pulse.

Pulse timer input ports include LOAD0 651, LOAD1 652, COUNT 653, RSTN 657, VALUE0 658 and VALUE1 659. Pulse timer output ports include LOAD_DONE 654 and CNT_EQ_ZERO 655.

Pulse sequencer input ports include ENABLE 706, RSTN 707, LOAD_DONE 704 and CNT_EQ_ZERO 705. Pulse sequencer output ports include ACTIVE 708, PULSE 709, LOAD0 701, LOAD1 702 and COUNT 703.

Note the connections between pulse generator's 600 input/output ports and its two sub-blocks:

Pulse generator input ENABLE 602 is connected to pulse sequencer input ENABLE 706.

Pulse generator input RSTN 607 is connected to pulse timer input RSTN 657 and connected to pulse sequencer input RSTN 707.

Pulse generator input PULSE_LOW_TIME 608 is connected to pulse timer input VALUE0 658.

Pulse generator input PULSE_HIGH_TIME 609 is connected to pulse timer input VALUE1 659.

Pulse sequencer output ACTIVE 708 drives pulse generator output ACTIVE 604.

Pulse sequencer output PULSE 709 drives pulse generator output PULSE 606.

Also note the connections between the pulse sequencer 700 and the pulse timer 650:

Pulse sequencer output LOAD0 701 connects to pulse timer input LOAD0 651.

Pulse sequencer output LOAD1 702 connects to pulse timer input LOAD1 652.

Pulse sequencer output COUNT 703 connects to pulse timer input COUNT 653.

Pulse timer output LOAD_DONE 654 connects to pulse sequencer input LOAD_DONE 704.

Pulse timer output CNT_EQ_ZERO 655 connects to pulse sequencer input CNT_EQ_ZERO 705.

Now, consider details of pulse sequencer 700. Pulse sequencer 700 is an asynchronous state machine that steps through low and high phases of a unit pulse and controls pulse timer 650.

Figure 20:
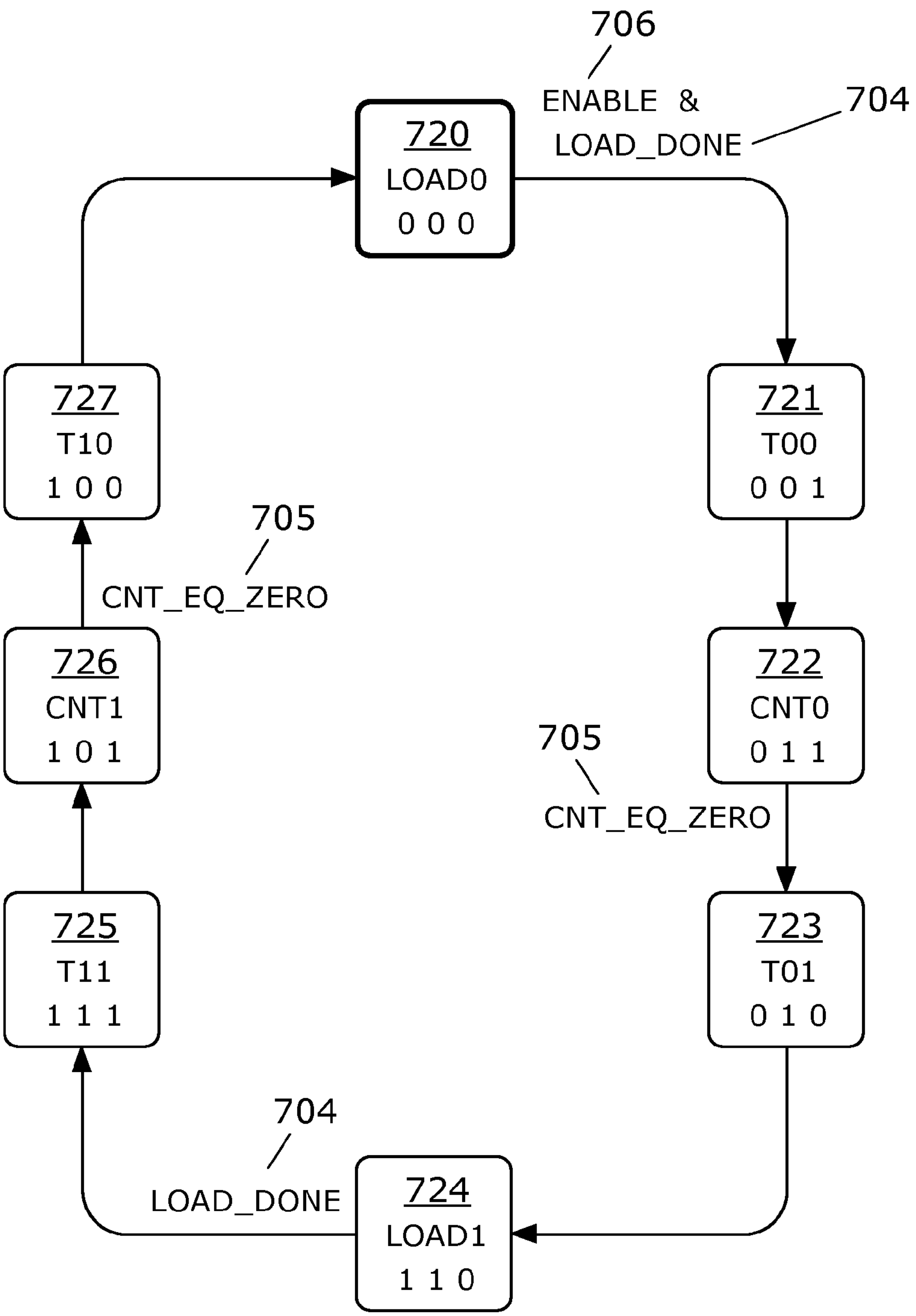
FIG. 20 is the state transition diagram for the pulse sequencer.

FIG. 20 is pulse sequencer's 700 exemplary state transition diagram, and FIG. 21 is pulse sequencer's state table. The path through the states may be both cyclical and non-branching. Pulse sequencer state encodings follow a Gray code sequence, enabling smooth glitch-free state transitions. While some embodiments of a pulse sequencer use a Gray code sequence, any Hamming-distance-1 sequence is suitable. An important requirement is that only one state bit changes when advancing from state to state.

Referring to FIG. 20 and FIG. 21, here is a description of each state:

State LOAD0 720 is a pulse sequencer's initial state or start state. During state LOAD0 720, pulse sequencer 700 asserts output LOAD0 701, telling pulse timer 650 to set its phase counter to PULSE_LOW_TIME 608. To exit state LOAD0 720, pulse sequencer inputs LOAD_DONE 704 and ENABLE 706 must both be 1. The next state is state T00 721.

Pulse sequencer states T00 721, T01 723, T11 725 and T10 727 are transition states. They provide a small time separation between load states and count states. This separation facilitates non-overlapping assertion of outputs LOAD0 701, LOAD1 702 and COUNT 703 for selecting pulse timer mode. Exit conditions for these states are always true; meaning, pulse sequencer 700 immediately moves to the next state.

During state CNT0 722, pulse sequencer 700 asserts output COUNT 703, telling pulse timer 650 to count down to zero. The pulse sequencer 700 exits state CNT0 722 when input CNT_EQ_ZERO 705 is 1. The next state is state T01 723.

During state LOAD1 724, pulse sequencer 700 asserts output LOAD1 702, telling pulse timer 650 to set its phase counter to PULSE_HIGH_TIME 609. The pulse sequencer 700 exits state LOAD1 724 when input LOAD_DONE 704 is 1. The next state is state T11 725.

During state CNT1 726, pulse sequencer 700 asserts output COUNT 703, telling pulse timer 650 to count down to zero. Also, pulse sequencer 700 asserts output PULSE 709 during state CNT1 726. The pulse sequencer 700 exits state CNT1 726 when input CNT_EQ_ZERO 705 is 1. The next state is state T10 727.

Pulse sequencer output ACTIVE 708 is asserted continuously during states T00 721, CNT0 722, T01 723, LOAD1 724 and T11 725. Alternative embodiments of the pulse generator 600 may extend assertion of ACTIVE 708 either partially or fully through state CNT1 726.

In some embodiments of pulse sequencer 700, state LOAD0 720 is a start state. Alternative pulse sequencer embodiments may have a different start state. For example, state T10 727, state T01 723 or state LOAD1 724 may be a start state for a pulse sequencer state machine.

In some embodiments of pulse sequencer 700, state LOAD0 720 is an idle state when input ENABLE 706 is 0. Alternative pulse sequencer embodiments may have a different idle state. For example, state T10 727, state T01 723 or state LOAD1 724 may be an idle state for a pulse sequencer state machine.

FIG. 22, comprising parts A, B, C and D, is a gate-level schematic diagram of pulse sequencer 700. Enhanced SR latches—SRLATs 730, 731 and 732 in FIG. 22A—store pulse sequencer's current state in its encoded form (i.e. three bits representing eight states). Current state signals CURR_STATE[0] 740, CURR_STATE[1] 741 and CURR_STATE[2] 742 are driven from Q outputs of SRLATs 730, 731 and 732, respectively. A complemented copy of current state—signals CURR_STATE_N[0] 750, CURR_STATE_N[1] 751 and CURR_STATE_N[2] 752—are driven from QN outputs of SRLATs 730, 731 and 732, respectively. State bit set signals SET_STATE_BIT[0] 780, SET_STATE_BIT[1] 781 and SET_STATE_BIT[2] 782 feed S inputs of SRLAT 730, 731 and 732, respectively. State bit reset signals RST_STATE_BIT[0] 790, RST_STATE_BIT[1] 791 and RST_STATE_BIT[2] 792 feed R inputs of SRLATs 730, 731 and 732, respectively.

Figure 22A:
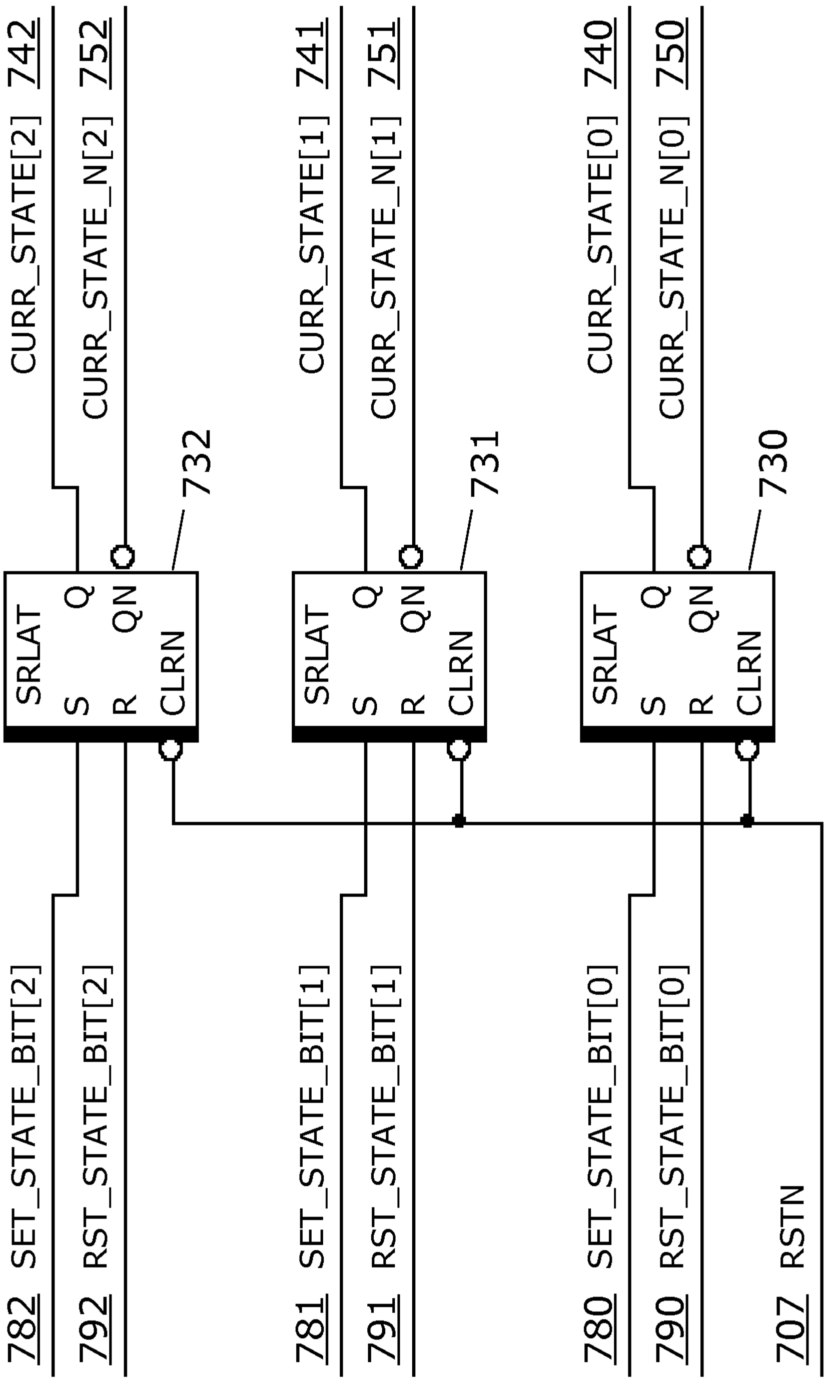
FIG. 22, comprising parts A, B, C and D, is a gate-level logic schematic of the pulse sequencer.
Figure 22B:
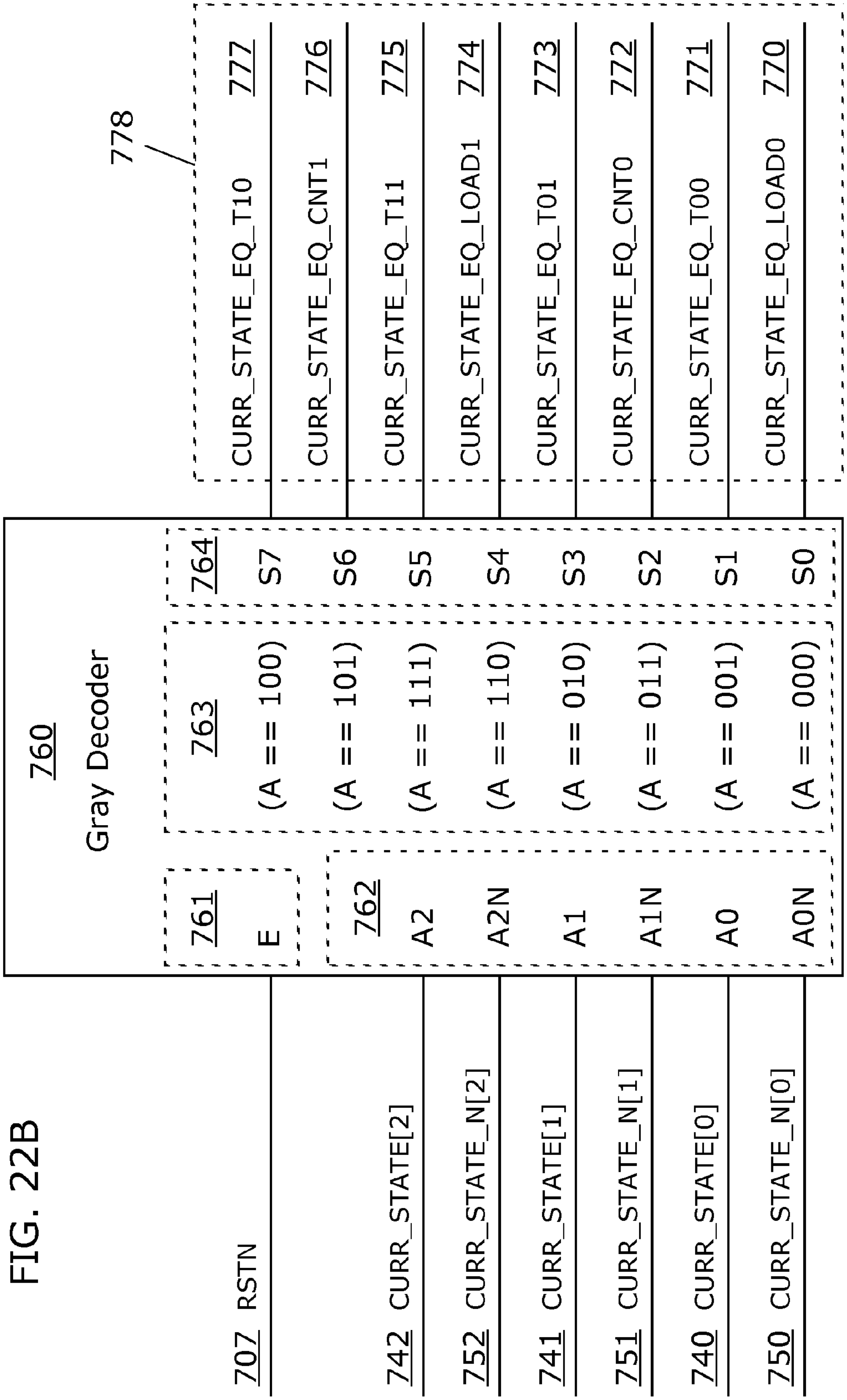

Illustrated in FIG. 22B, a Gray decoder 760 decodes pulse sequencer's current state. The current state signals—CURR_STATE[2:0] 742, 741 and 740—and their complements—CURR_STATE_N[2:0] 752, 751 and 750—are fed into Gray decoder's address inputs {A2, A1, A0, A2N, A1N, A0N} 762. Also, pulse sequencer input RSTN 707 feeds Gray decoder's enable input, E 761. On its eight select outputs {S0, S1, S2, S3, S4, S5, S6, S7} 764, Gray decoder 760 produces current-state-decode signals 778, each representing a pulse sequencer state as follows.

signal CURR_STATE_EQ_LOAD0 770 for state LOAD0 720
signal CURR_STATE_EQ_T00 771 for state T00 721
signal CURR_STATE_EQ_CNT0 772 for state CNT0 722
signal CURR_STATE_EQ_T01 773 for state T01 723
signal CURR_STATE_EQ_LOAD1 774 for state LOAD1 724
signal CURR_STATE_EQ_T11 775 for state T11 725
signal CURR_STATE_EQ_CNT1 776 for state CNT1 726
signal CURR_STATE_EQ_T10 777 for state T10 727

The Gray decoder 760 is the same as an ordinary binary decoder except that its decoded outputs {S0, S1, S2, S3, S4, S5, S6, S7} 764 may be internally reordered in Gray code sequence {3'b000, 3'b001, 3'b011, 3'b010, 3'b110, 3'b111, 3'b101, 3'b100} 763. When enabled, one current-state-decode signal is asserted at any given time.

Connecting pulse sequencer input RSTN 707 to Gray decoder input E 761 has the effect of forcing current-state-decode signals 778 to 0 during pulse sequencer reset. Disabling Gray decoder 760 in this manner during reset is optional. Alternative embodiments of pulse sequencer 700 may choose to tie off Gray decoder input E 761 to 1 so that it is always enabled.

Figure 22C:
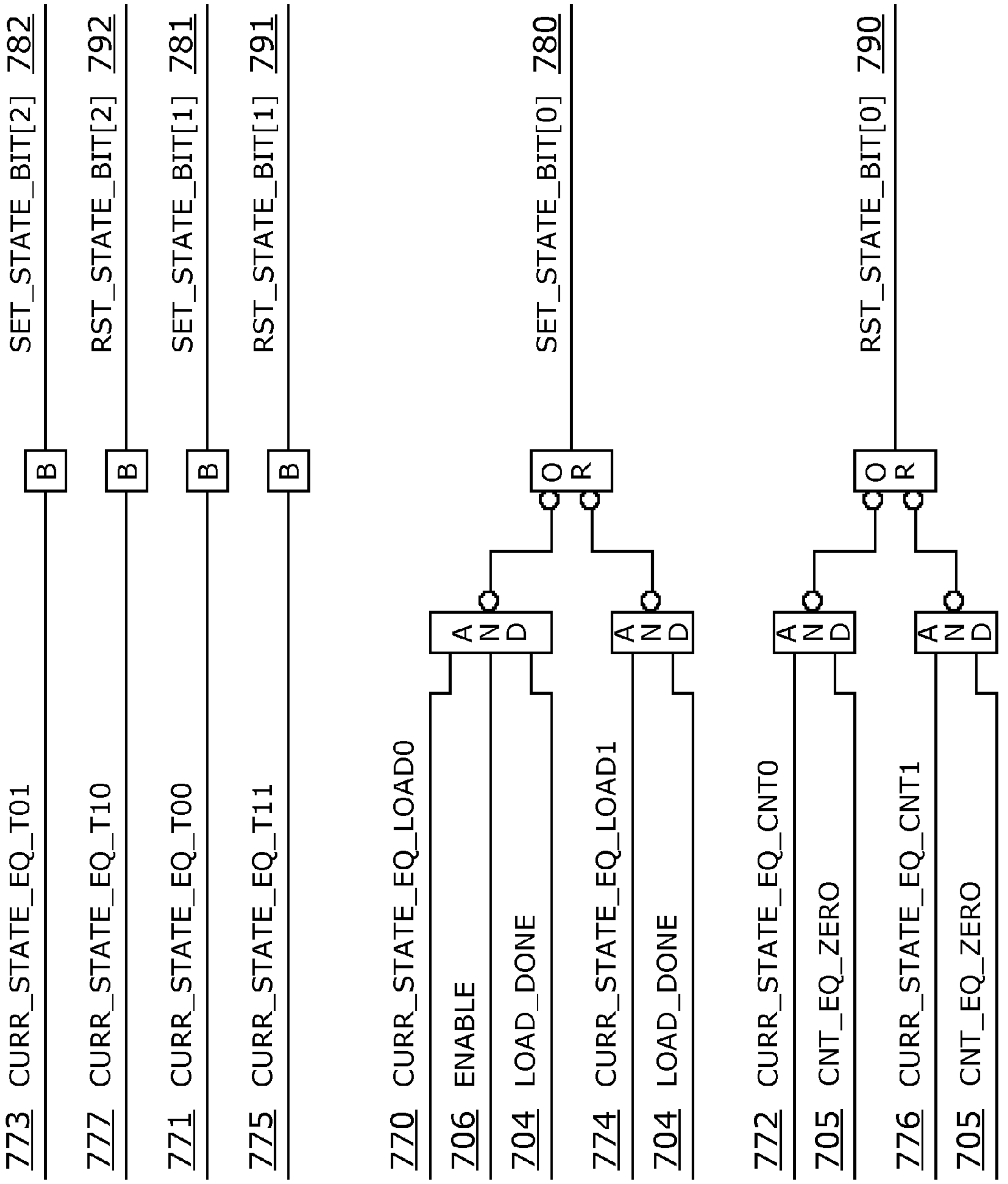

FIG. 22C illustrates how pulse sequencer's latch set and reset signals are generated as functions of current state decodes and pulse sequencer inputs.

Figure 22D:
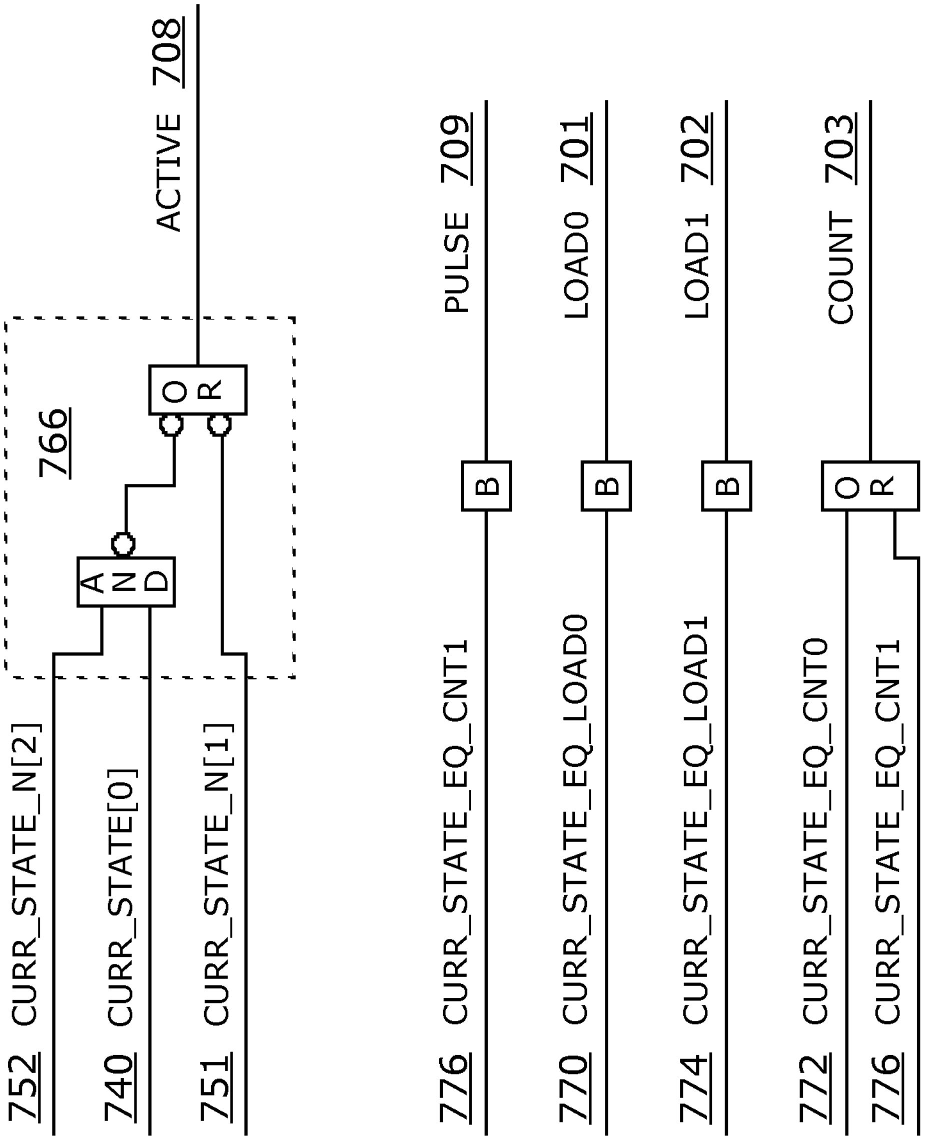

FIG. 22D illustrates how pulse sequencer's outputs are generated.

Pulse sequencer output ACTIVE 708 is asserted during consecutive states T00 721, CNT0 722, T01 723, LOAD1 724 and T11 725. ACTIVE 708 is decoded directly from CURR_STATE and CURR_STATE_N using glitch-free logic circuit 766 to avoid potential decoder glitches on transitions between consecutive states. Eliminating glitches ensures that consumers of ACTIVE 708 function properly.

Pulse sequencer output PULSE 709 is a buffered copy of state decode signal CURR_STATE_EQ_CNT1 776. Pulse sequencer output LOAD0 701 is a buffered copy of state decode signal CURR_STATE_EQ_LOAD0 770. Pulse sequencer output LOAD1 702 is a buffered copy of state decode signal CURR_STATE_EQ_LOAD1 774. Pulse sequencer output COUNT 703 is the OR of two non-consecutive state decodes—CURR_STATE_EQ_CNT0 772 and CURR_STATE_EQ_CNT1 776.

An application for a self-timed pulse generator is to produce the clock for a synchronous logic block such as a functional unit in a system-on-chip device (SOC). When a self-timed pulse generator and the synchronous logic it drives are proximate, their speeds are well correlated since both are subject to the same process, voltage and temperature (PVT) envelope. Given that speed correlation, it is okay for the clock frequency to vary with local PVT conditions. Using a self-timed pulse generator as a clock generator for synchronous logic creates a hybrid synchronous/asynchronous system that reaps benefits from both synchronous and asynchronous design schools. From the synchronous school, we get the advantage of highly interdependent logic operating in lock-step with minimal handshake overhead. From the asynchronous school, we get the advantage of logic being able to automatically adjust its operating frequency to match the current operating environment.

A further advantage to using a self-timed pulse generator as a clock generator is that it replaces traditional clock generator components—a reference oscillator and phase-locked loop circuit—yielding cost savings.

In other applications, a self-timed pulse generator is used to generate a strobe in response to some triggering event. Depending on the nature of the event, the strobe can be used to store data associated with the event and/or update an event counter. Data could include results of a computation, data received from a communications channel or context of an error. Event counters could be recording performance metrics or error instances.

Figures 23, 24:
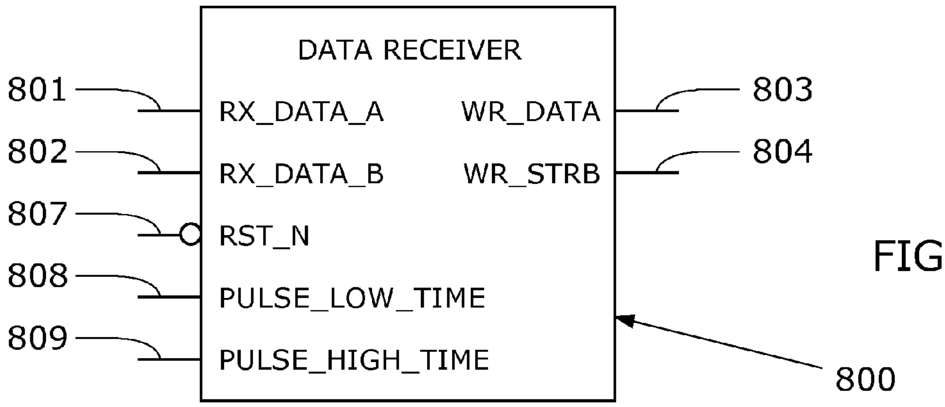
FIG. 23 is a black box diagram of the data receiver showing its inputs and outputs.
FIG. 24 is a table showing the four options for encoding a data bit on the two-wire channel on which the data receiver operates.

Turn now to a third aspect of the present invention—a data receiver. FIG. 23 is a black box diagram of data receiver 800, which shows its input and output ports. Inputs include RX_DATA_A 801, RX_DATA_B 802, RSTN 807, PULSE_LOW_TIME 808 and PULSE_HIGH_TIME 809.

Outputs include WR_DATA 803 and WR_STRB 804.

Data receiver 800 receives and decodes data from an asynchronous two-wire bit-channel, connected to inputs RX_DATA_A 801 and RX_DATA_B 802; presents the received and decoded data on output WR_DATA 803; and generates write strobes on output WR_STRB 804 for storing the recovered data in some external storage. Data storage is not part of data receiver 800. Inputs PULSE_LOW_TIME 808 and PULSE_HIGH_TIME 809 control delay and width of the write strobes produced on output WR_STRB 804. Input RSTN 807 is an active-low asynchronous reset for initializing data receiver 800.

First consider the data transmission protocol used on the asynchronous two-wire bit-channel on which data receiver 800 operates. Being asynchronous, there is no common clock or shared timing reference among transmitters and receivers. Both bit values and bit-to-bit transitions are coded in the transmission stream. Transmissions may start and stop at any time, and the transmission rate may vary without warning. The only restriction is that the minimum bit-time may not go below an a priori limit determined by a receiver's capabilities.

At the physical layer, each bit-channel may have two wires, which convey two-bit code words. FIG. 24 defines four possible options—OPTION A 861, OPTION B 862, OPTION C 863 and OPTION D 864—for representing a bit of information—DATA or D 865—in the two-bit code word—CODE_WORD[1:0] or CW[1:0] 860. FIG. 24 shows these four data encoding options in a truth table and with equations. For each data encoding option there may be two encodings for data value 0 and two encodings for data value 1. This dual encoding of each bit value enables a code word to convey consecutive bits of the same value by switching back and forth between the two codes for that same value. In the literature, this two-bit coding scheme is called level-encoded two-phase dual-rail encoding.

Figure 25:
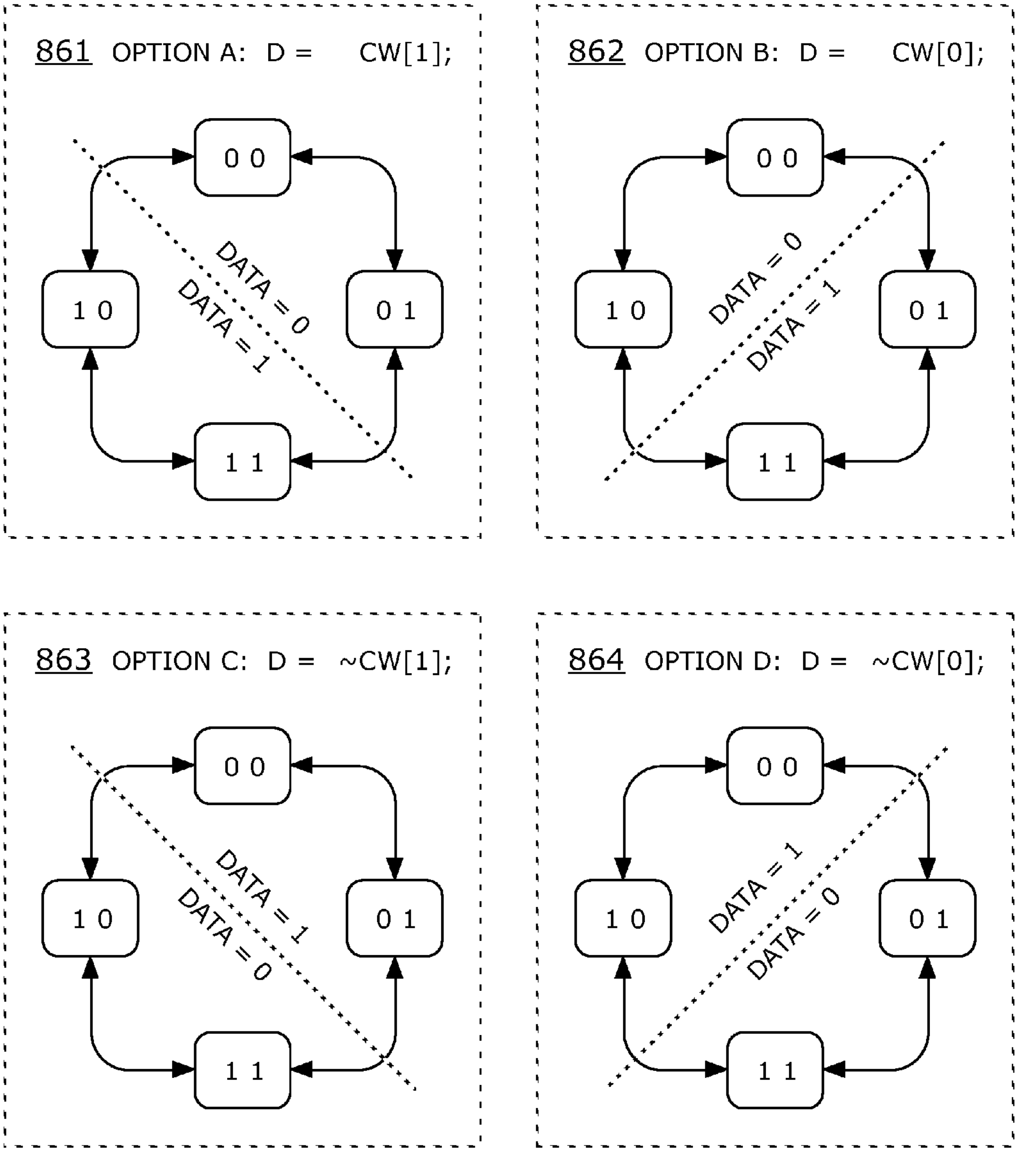
FIG. 25 illustrates allowable code-word transitions on the two-wire channel. A separate code word state transition diagram is shown for each of the four possible data bit encodings.

FIG. 25 includes a code word transition diagram for each of the four bit encoding options. Importantly, only one bit of a code word may change at any given time. Every code word value change is a bit-to-bit transition. Each time one bit changes, code word parity changes. Hence, a change in the two-bit code word parity indicates a bit-to-bit transition.

An embodiment of data receiver 800 uses coding OPTION A 861. Any of the other three coding options would work equally well. CODE_WORD[1] is received on data receiver input RX_DATA_A 801, and CODE_WORD[0] is received on data receiver input RX_DATA_B 802.

Nominally, the transmitter on a two-wire bit-channel uses a local clock to advance a data stream. To pause transmission, a sender holds the last code word on the interface. At the receiving end, data receiver 800 detects parity changes on the two-wire channel. On detection of a parity change, data receiver 800 generates a write strobe for an external entity to sample the received bit. External to data receiver 800, received data may be stored in a classic clock-domain crossing FIFO. Using standard synchronization techniques, the FIFO's write pointer is synchronized to the receiving unit's local clock. Data is read from the FIFO using a receiver's local clock. The only timing restriction on a bit-channel may be that bit-time—the amount of time a code word is sustained on a bit-channel—be greater than the trigger cycle of a data receiver's state machine.

Figure 26:
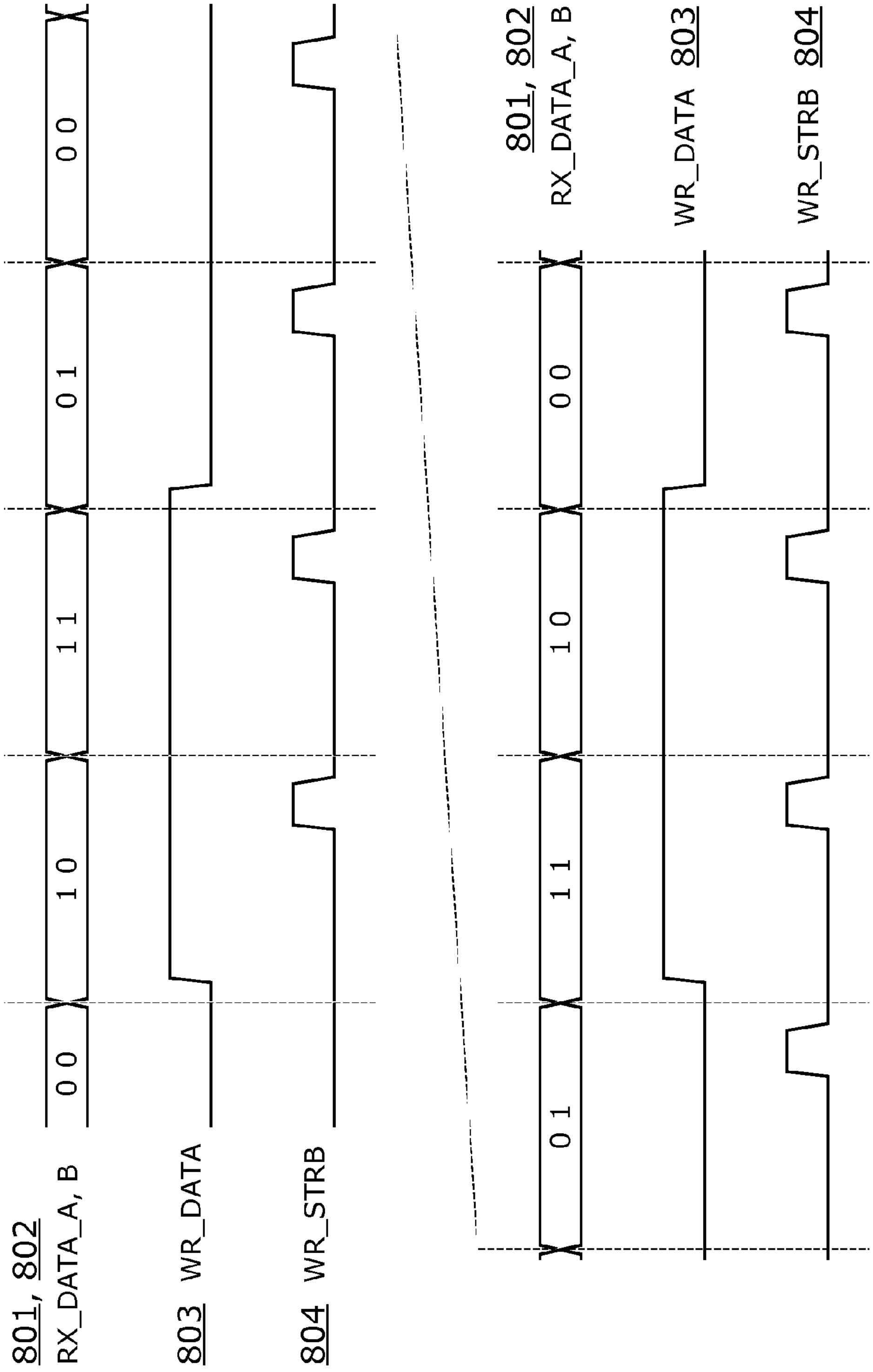
FIG. 26 is a functional timing diagram of the data receiver illustrating the recovery of a bit stream from a two-wire channel.

FIG. 26 is a functional timing diagram of data receiver 800, which may include only those inputs and outputs expected to be active during channel operations. After an initial quiescent period, inputs RX_DATA_A 801 and RX_DATA_B 802 transition from 2'b00 to 2'b10, indicating that a new bit is on the channel. Shortly after the code word transition, output WR_DATA 803 transitions from 0 to 1, reflecting the new data value in the new code word. A little while later output WR_STRB 804 delivers a self-timed pulse. Seven more code words follow. The recovered bit stream 1 0 0 0 1 1 0 is driven onto output WR_DATA 803. Each recovered bit may have an accompanying write pulse on output WR_STRB 804.

Figure 27:
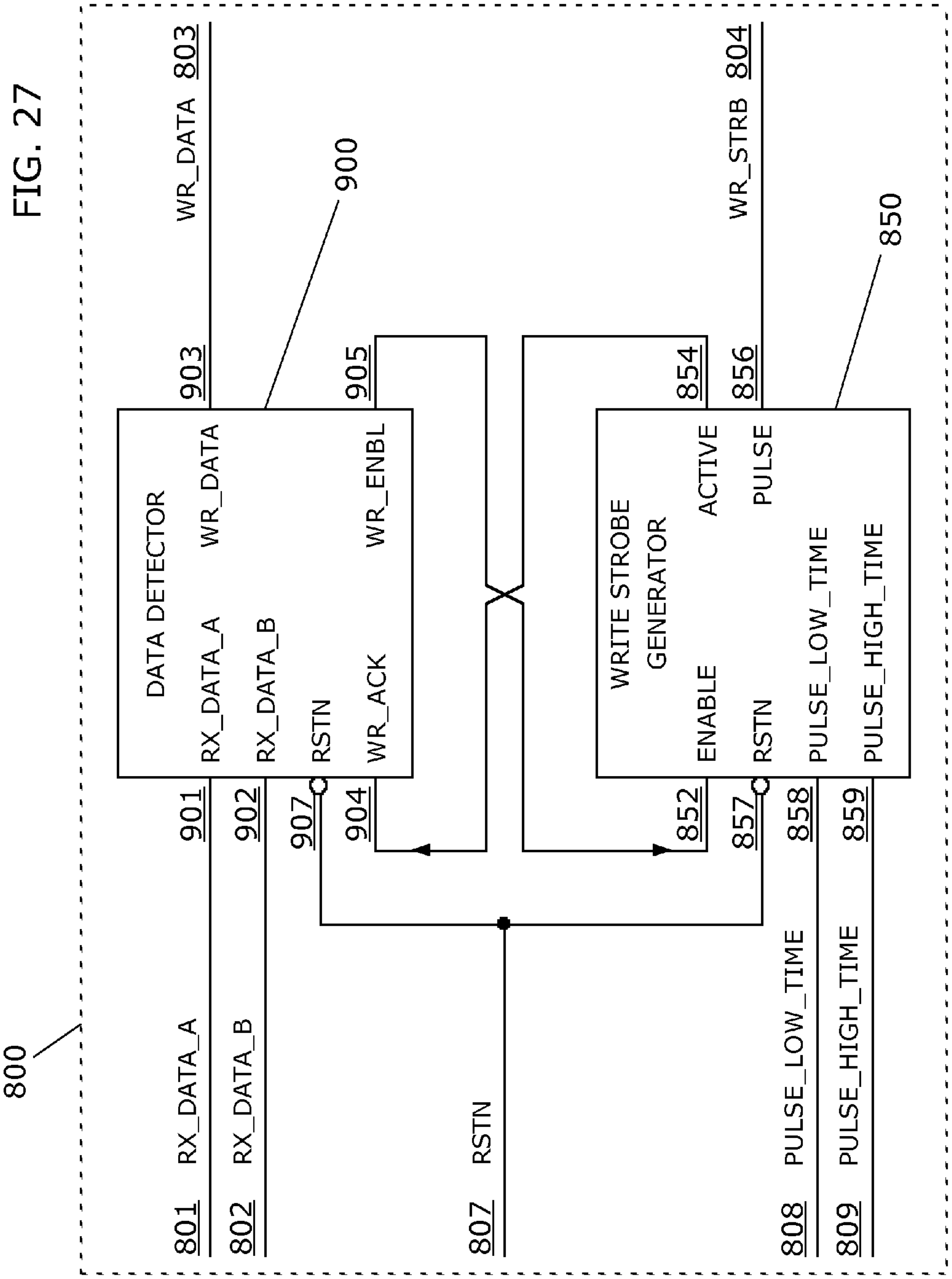
FIG. 27 is a top-level block diagram of the data receiver showing its two major sub-blocks—the data detector and the pulse generator—and the connections between them.

FIG. 27 is a block diagram of data receiver 800 showing its two sub-blocks write strobe generator 850 and data detector 900. Write strobe generator 850 is an embodiment of pulse generator 600 of the present invention. More specifically, in some embodiments of write strobe generator 850 are embodiments of pulse generator 600 described above. Data detector 900 monitors a two-wire bit-channel, decodes the current code word and reports the current bit value. On seeing a code word transition, data detector 900 directs write strobe generator 850 to generate a write pulse.

Here is an enumeration of the connections between data detector 900, write strobe generator 850 and external ports of data receiver 800 shown in FIG. 27.

Data receiver input RX_DATA_A 801 is connected to data detector input RX_DATA_A 901.

Data receiver input RX_DATA_B 802 is connected to data detector input RX_DATA_B 902.

Data receiver input RSTN 807 is connected to data detector input RSTN 907 and connected to write strobe generator input RSTN 857.

Data receiver n-bit input PULSE_LOW_TIME 808 is connected to write strobe generator n-bit input PULSE_LOW_TIME 858.

Data receiver n-bit input PULSE_HIGH_TIME 809 is connected to write strobe generator n-bit input PULSE_HIGH_TIME 859.

Data detector output WR_ENBL 905 is connected to write strobe generator input ENABLE 852.

Write strobe generator output ACTIVE 854 is connected to data detector input WR_ACK 904.

Data detector output WR_DATA 903 is connected to data receiver output WR_DATA 803.

Write strobe generator output PULSE 856 is connected to data receiver output WR_STRB 804.

Figure 28:
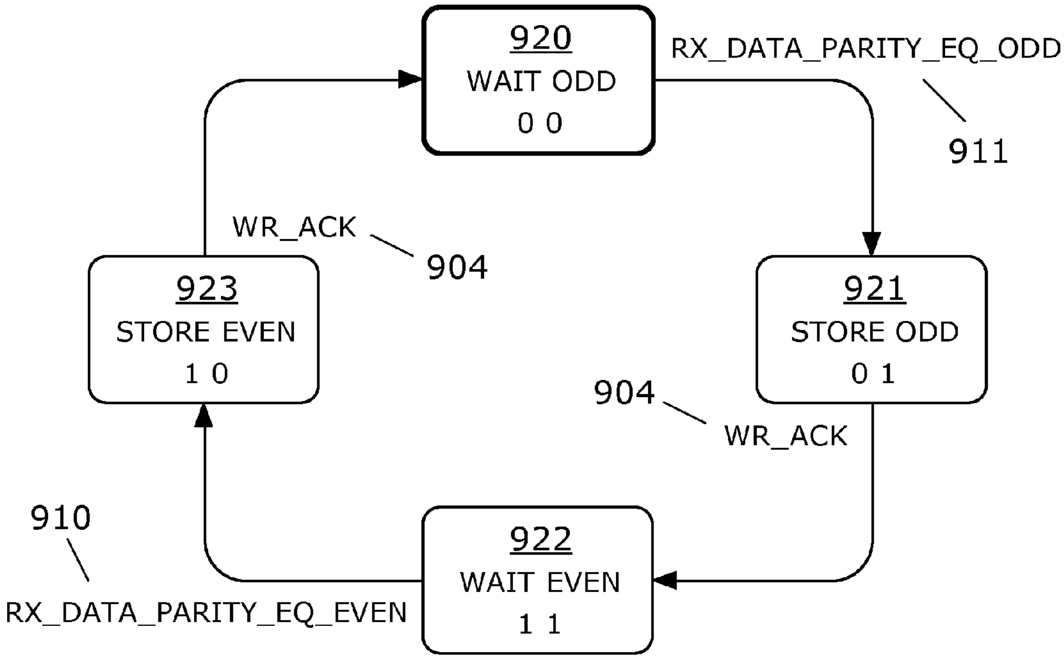
FIG. 28 is the state transition diagram for the data detector.

FIG. 28 is a data detector's state transition diagram. FIG. 29 is a data detector's state table. The path through the states is both cyclical and non-branching. Importantly, data detector state encodings follow a Gray code sequence, enabling smooth glitch-free state transitions. While some embodiments of a data detector uses the Gray code sequence, any Hamming-distance-1 sequence would be suitable. An important requirement is that only one state bit shall change when advancing from state to state.

Referring to FIG. 28 and FIG. 29, here is a description of each data detector state:

Data detector state WAIT ODD 920 is the initial state in one embodiment of data detector 900. In state WAIT ODD 920, data detector 900 is waiting for parity of the code word on inputs RX_DATA_A 901 and RX_DATA_B 902 to be odd, as indicated by internal data detector signal RX_DATA_PARITY_EQ_ODD 911. Data detector 900 advances to the next state—STORE ODD 921—when signal RX_DATA_PARITY_EQ_ODD 911 is asserted.

In data detector state STORE ODD 921, data detector 900 asserts output WR_ENBL 905, telling write strobe generator 850 to produce a write strobe. Data detector 900 advances to the next state—WAIT EVEN 922—when input WR_ACK 904 is asserted, which indicates that write strobe generator 850 has initiated a pulse cycle.

Data detector state WAIT EVEN 922 may be the initial state in an alternative embodiment of data detector 900. In state WAIT EVEN 922, data detector 900 is waiting for parity of the code word on inputs RX_DATA_A 901 and RX_DATA_B 902 to be even, as indicated by internal data detector signal RX_DATA_PARITY_EQ_EVEN 910. Data detector 900 advances to the next state—STORE EVEN 923—when signal RX_DATA_PARITY_EQ_EVEN 910 is asserted.

In data detector state STORE EVEN 923, data detector 900 asserts output WR_ENBL 905, telling write strobe generator 850 to produce a write strobe. Data detector 900 advances to the next state—WAIT ODD 920—when input WR_ACK 904 is asserted, which indicates that write strobe generator 850 has initiated a pulse cycle.

In one embodiment of data detector 900, output WR_DATA 903 equals input RX_DATA_A 901. As discussed earlier, other bit-channel data encodings are equally valid. In an alternative embodiment, the bit-channel data encoding may be selectable, allowing any one of the four data coding options to be chosen by instance or programming instead of by design.

Figure 30A:
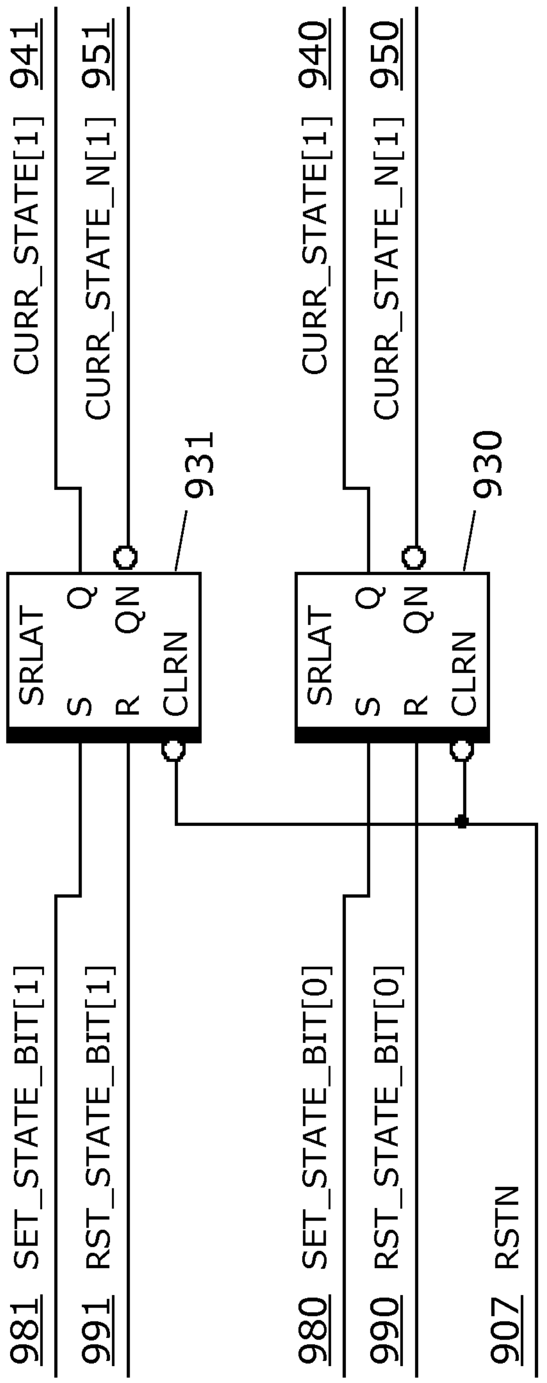
FIG. 30, comprising parts A, B and C, is a gate-level schematic of the data detector.

FIG. 30, comprising parts A, B and C, is a gate-level schematic diagram of data detector 900. Enhanced SR latches—SRLATs 930 and 931 in FIG. 30A—store a data detector's current state in its encoded form (i.e. two bits representing four states). Current state signals CURR_STATE[0] 940 and CURR_STATE[1] 941 are driven from the Q outputs of SRLATs 930 and 931, respectively. A complemented copy of current state—signals CURR_STATE_N[0] 950 and CURR_STATE_N[1] 951—are driven from the QN outputs of SRLATs 930 and 931, respectively. State bit set signals SET_STATE_BIT[0] 980 and SET_STATE_BIT[1] 981 feed the S inputs of SRLATs 930 and 931, respectively. State bit reset signals RST_STATE_BIT[0] 990, RST_STATE_BIT[1] 991 feed the R inputs of SRLAT 930 and 931, respectively.

Figure 30B:
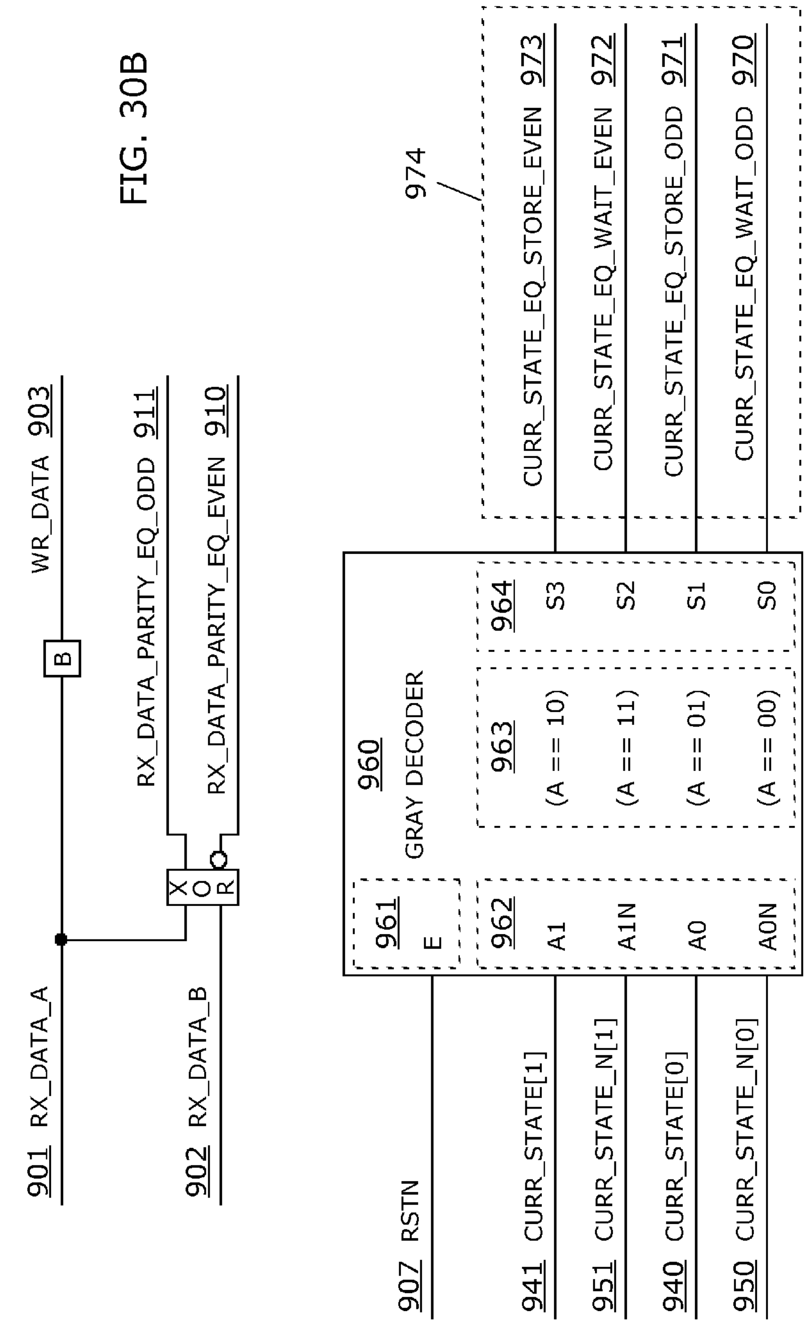

Illustrated in FIG. 30B, a Gray decoder 960 decodes a data detector's current state. The current state signals—CURR_STATE[1:0] 941 and 940—and their complements CURR_STATE_N[1:0] 951 and 950—are fed into a Gray decoder's address inputs {A1, A0, A1N, A0N} 962. Also, data detector input RSTN 907 feeds a Gray decoder's enable input, E 961. On its four select outputs {S0, S1, S2, S3} 964, Gray decoder 960 produces current-state-decode signals 974, each representing a data decoder state as follows.

signal CURR_STATE_EQ_WAIT_ODD 970 for state WAIT ODD 920 signal CURR_STATE_EQ_STORE_ODD 971 for state STORE ODD 921 signal CURR_STATE_EQ_WAIT_EVEN 972 for state WAIT EVEN 922 signal CURR_STATE_EQ_STORE_EVEN 973 for state STORE EVEN 923

The Gray decoder 960 is the same as an ordinary binary decoder except that its decoded outputs {S0, S1, S2, S3} 964 may be internally reordered in Gray code sequence {2'b00, 2'b01, 2'b11, 2'b10} 963. While enabled, one current-state-decode signal is asserted at any given time.

Connecting data detector input RSTN 907 to Gray decoder input E 961 has the effect of forcing the current-state-decode signals 974 to 0 during data detector reset. Disabling Gray decoder 960 in this manner during reset is optional. Alternative embodiments of data detector 900 may choose to tie off Gray decoder input E 961 to 1 so that it is always enabled.

In FIG. 30B, signal RX_DATA_PARITY_EQ_EVEN 910—the XNOR of inputs RX_DATA_A 901 and RX_DATA_B 902—indicates when code word parity is even. Signal RX_DATA_PARITY_EQ_ODD 911—the XOR of inputs RX_DATA_A 901 and RX_DATA_B 902—indicates when code word parity is odd. Data detector output WR_DATA 903 is a buffered copy of input RX_DATA_A 901.

Figure 30C:
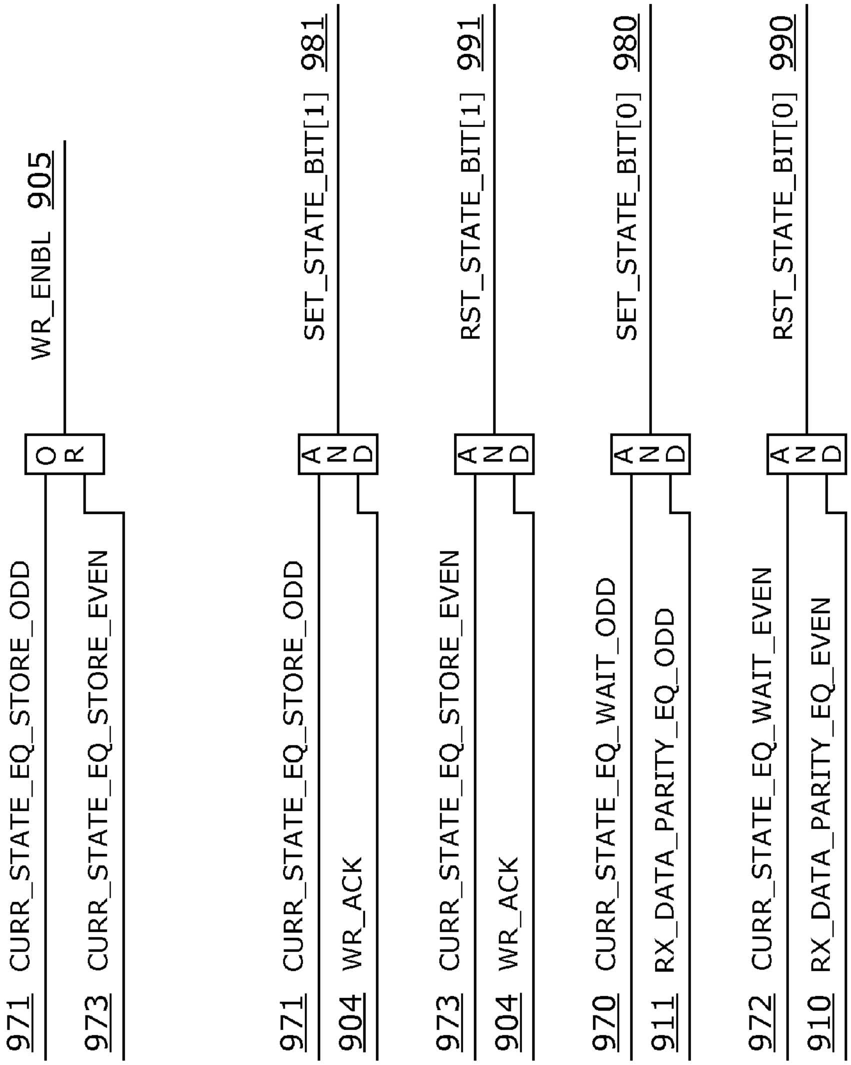

FIG. 30C illustrates how data detector's state bit set and reset signals are generated as functions of current state decode signals CURR_STATE_EQ_WAIT_ODD 970, CURR_STATE_EQ_STORE_ODD 971, CURR_STATE_EQ_WAIT_EVEN 972 and CURR_STATE_EQ_STORE_EVEN 973; signals RX_DATA_PARITY_EQ_EVEN 910 and RX_DATA_PARITY_EQ_ODD 911; and input WR_ACK 904.

Data detector output WR_ENBL 905 is the OR of two non-consecutive states CURR_STATE_EQ_STORE_ODD 971 and CURR_STATE_EQ_STORE_EVEN 973.

A two-wire bit-channel and a self-timed data receiver are the foundation for the physical layer of an asynchronous communications network. Such a network is particularly well suited for moving data among functional units in a large chip (e.g. a system-on-chip device or SOC). This may include primary mission networks that convey processor instructions and data, mass storage data blocks, external network data, voice, images, virtually any type of information. SOC background networks that access internal control and status registers are also excellent candidates for this type of network.

In synchronous networks, operating frequency is inversely related to channel length—the longer the channel, the slower the clock. Also, global clock distribution and skew management in synchronous networks may require additional timing margin to be built into the clock period, further diminishing performance. Inherently, an asynchronous network can move data faster. Furthermore, the lack of a free-running, globally distributed clock may mean that the asynchronous network will consume less power.

In some embodiments a self-timed timer characterized by an asynchronous state machine, comprises a time measurement sequence comprising a plurality of states in the asynchronous state machine for measuring time in proportion to the number of executed state transitions during a specified time measurement period; wherein each executed state transition counts as one time unit and the plurality of executed states in the specified time measurement period yields a plurality of time units such that the sum of the time units is equal to the time period of the specified time measurement period; optionally, a self-timed timer further comprises at least one time measurement done state in the time measurement sequence for holding between time measurement periods; optionally, a self-timed timer further comprises a time measurement done output operable to indicate the self-timed timer is in the at least one time measurement done state; optionally, a self-timed timer further comprises a time measurement mode such that in the time measurement mode the asynchronous state machine advances through the time measurement sequence and holds the asynchronous state machine in the at least one time measurement done state; optionally, a self-timed timer further comprises a time measurement enable input operable to cause the asynchronous state machine to enter the time measurement mode; optionally, a self-timed timer further comprises a time measurement duration select input operable to specify the duration of the time measurement period by selecting a segment of the time measurement sequence for execution while in the time measurement mode; optionally, a self-timed timer further comprises a self-timed timer ready output operable to indicate that the self-timed timer is ready to begin a time measurement period; optionally, a self-timed timer comprises an asynchronous state machine comprising n state bits and the number of time units in the asynchronous state machine is an exponential function of the number of state bits in the asynchronous state machine; optionally, a self-timed timer comprises n state bits to enable time units of the self-timed timer up to $(2^n-1)$ time units; optionally, a self-timed timer has an area complexity on the order of $n \times \log_2(n)$, where n is the number of state bits.

In some embodiments a self-timed pulse generator for producing unit pulse sequences, singular or periodic, comprises a pulse sequencer, characterized by an asynchronous state machine, for controlling the generation of the unit pulses, comprising a state for each phase in the unit pulse; wherein the unit pulse comprises at least a low or high phase and the unit pulse sequence may be a singular unit pulse comprising one or more phases or periodic unit pulses each comprising at least one phase; optionally, a self-timed pulse generator further comprises a pulse output for delivering the unit pulses; optionally, a self-timed pulse generator further comprises a pulse timer comprising a self-timed timer for measuring duration of the phases of the unit pulses; optionally, a self-timed pulse generator further comprises an enable input for controlling the number of unit pulses in a unit pulse sequence; optionally, a self-timed pulse generator further comprises an active output for indicating that the self-timed pulse generator is producing a unit pulse; optionally, a self-timed pulse generator further comprises a phase duration input for controlling the duration of a pulse phase; optionally, a self-timed pulse generator further has a pulse generator with a continuous mode and pulse mode; optionally, a self-timed pulse generator produces a periodic clock sequence in the continuous mode; optionally, a self-timed pulse generator wherein in the pulse mode the pulse generator launches a string of pulses.

In some embodiments a self-timed data receiver for receiving data from a two-wire asynchronous communications channel wherein each bit is conveyed in a two-bit code word, comprises two receive data inputs, for monitoring the two-wire asynchronous communications channel for two-bit code words; and a data detector characterized by an asynchronous state machine for recognizing and decoding code words on the two receive data inputs comprising; a wait odd state, for waiting for an odd parity code word on the two receive data inputs; a store odd state, for generating a write strobe for datum recovered from an odd parity code word; a wait even state, for waiting for an even parity code word on the two receive data inputs; and a store even state, for generating a write strobe for datum recovered from an even parity code word; wherein the two receive data inputs receive two-bit code words from the two-wire asynchronous communications channel and the data detector decodes the two-bit code word; optionally, a self-timed data receiver further comprises a write data output, for reporting received and decoded data values to an external entity; and a write strobe output, for delivering write strobes to the external entity enabling it to capture the received and decoded data values on the write data output; wherein the write data output reports the received and decoded data to an external entity and the write strobe output delivers a write strobe with each reported datum to the external entity; optionally, a self-timed data receiver further comprises a pulse generator for generating the write strobes on the write strobe output.

It shall be recognized that the present invention, in whole or in part, may be suitable for use in all classes of digital systems including, without limitation: acquisition, processing, storage, communications, control, data, audio, graphics, photographic image, video, internet, cloud, network infrastructure, enterprise, business, financial, engineering, scientific, medical, industrial, military, aerospace, automotive, instrument, embedded, office, home, consumer, portable and mobile. Further, it shall be recognized that the present invention may be implemented in any digital circuit technology including, without limitation: MOS, NMOS, CMOS, bipolar, TTL, ECL, GaAs, other semiconductor technologies and optical technologies. Further, it shall be recognized that the present invention may be implemented in any device class including, without limitation: custom, standard cell, mask-programmable gate array, field-programmable gate array, other programmable logic devices and discrete logic circuits.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents and other references mentioned herein are incorporated by reference in their entirety.

I claim:

1. A self-timed timer characterized by an asynchronous state machine, comprising:

- a time measurement sequence comprising a plurality of states in the asynchronous state machine for measuring time in proportion to the number of executed state transitions during a specified time measurement period;
- at least one time measurement done state in the time measurement sequence for holding between time measurement periods;
- a time measurement mode such that in the time measurement mode the asynchronous state machine advances through the time measurement sequence and holds the asynchronous state machine in the at least one time measurement done state; and a time measurement duration select input operable to specify the duration of the time measurement period by selecting a segment of the time measurement sequence for execution; wherein each executed state transition counts as one time unit and the plurality of executed states in the specified time measurement period yields a plurality of time units such that the sum of the time units is equal to the time period of the specified time measurement period.

2. The self-timed timer of claim 1, further comprising a time measurement done output operable to indicate the self-timed timer is in the at least one time measurement done state.

3. The self-timed timer of claim 1, further comprising a time measurement enable input operable to cause the asynchronous state machine to enter the time measurement mode.

4. The self-timed timer of claim 1 further comprising a self-timed timer ready output operable to indicate that the self-timed timer is ready to begin a time measurement period.

5. The self-timed timer of claim 1 wherein the asynchronous state machine comprises n state bits and the number of time units in the asynchronous state machine is an exponential function of the number of state bits in the asynchronous state machine.

6. The self-timed timer of claim 5 wherein the n state bits enable time units of the self-timed timer up to $(2^n-1)$ time units.

7. The self-timed timer of claim 1 wherein the self-timed timer has an area complexity on the order of $n \times \log_2(n)$, where n is the number of state bits.

8. A self-timed pulse generator for producing unit pulse sequences, singular or periodic, comprising:

a pulse sequencer, characterized by first asynchronous state machine, for controlling the generation of the unit pulses, comprising a state for each phase in the unit pulse; and a pulse timer comprising a self-timed timer for measuring duration of the phases of the unit pulses comprising a time measurement sequence comprising a plurality of states in a second asynchronous state machine for measuring time in proportion to the number of executed state transitions during a specified time measurement period and a time measurement duration select input operable to specify the duration of the time measurement period by selecting a segment of the time measurement sequence for execution; wherein the unit pulse comprises at least a low or high phase and the unit pulse sequence may be a singular unit pulse comprising one or more phases or periodic unit pulses each comprising at least one phase.

9. The self-timed pulse generator of claim 8 further comprising a pulse output for delivering the unit pulses.

10. The self-timed pulse generator of claim 8 further comprising an enable input for controlling the number of unit pulses in a unit pulse sequence.

11. The self-timed pulse generator of claim 8 further comprising an active output for indicating that the self-timed pulse generator is producing a unit pulse.

12. The self-timed pulse generator of claim 8 further comprising a phase duration input for controlling the duration of a pulse phase.

13. The self-timed pulse generator of claim 8 wherein the pulse generator has a continuous mode and pulse mode.

14. The self-timed pulse generator of claim 13 wherein the pulse generator produces a periodic clock sequence in the continuous mode.

15. The self-timed pulse generator of claim 13 wherein in the pulse mode the pulse generator launches a string of pulses.

16. A self-timed data receiver for receiving data from a two-wire asynchronous communications channel wherein each bit is conveyed in a two-bit code word, comprising;

two receive data inputs, for monitoring the two-wire asynchronous communications channel for two-bit code words; and a data detector characterized by an asynchronous state machine for recognizing and decoding code words on the two receive data inputs comprising;

a wait odd state, for waiting for an odd parity code word on the two receive data inputs;

a store odd state, for generating a write strobe for datum recovered from an odd parity code word;

a wait even state, for waiting for an even parity code word on the two receive data inputs; and a store even state, for generating a write strobe for datum recovered from an even parity code word; wherein the two receive data inputs receive two-bit code words from the two-wire asynchronous communications channel and the data detector decodes the two-bit code words.

17. The self-timed data receiver of claim 16 further comprising;

a write data output, for reporting received and decoded data values to an external entity; and a write strobe output, for delivering write strobes to the external entity enabling it to capture the received and decoded data values on the write data output; wherein the write data output reports the received and decoded data to an external entity and the write strobe output delivers a write strobe with each reported datum to the external entity.

18. The self-timed data receiver of claim 17, further comprising a pulse generator for generating the write strobes on the write strobe output.

* * * * *